(12) United States Patent
Karuchula et al.

(10) Patent No.: US 8,792,550 B2
(45) Date of Patent: Jul. 29, 2014

(54) COLOR/GRAY PATCH PREVENTION FOR VIDEO CODING

(75) Inventors: Venkata Naga Poleswara Rao Karuchula, Hyderabad (IN); Ashish Bajaj, Hyderabad (IN); Surya Manikya Phanindra Kalanadhabhatla, Hyderabad (IN); Praneeth Paladugu, Hyderabad (IN); Aditya Bhuvanagiri, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 400 days.

(21) Appl. No.: 13/198,588

(22) Filed: Aug. 4, 2011

(65) Prior Publication Data
US 2013/0034149 A1 Feb. 7, 2013

(51) Int. Cl.
*H04N 7/50* (2006.01)
*H04N 11/04* (2006.01)
*H04N 7/26* (2006.01)

(52) U.S. Cl.
CPC . *H04N 7/50* (2013.01); *H04N 11/04* (2013.01)
USPC ............. 375/240.03; 375/240.02; 375/240.12

(58) Field of Classification Search
CPC ........... H04B 1/66; H04N 11/04; H04N 7/12; H04N 7/50
USPC .................. 375/240.03, 240.24, 245, 240.18, 375/E07.245, E07.212, E07.126; 348/405, 348/419; 341/200; 382/251, 243
See application file for complete search history.

(56) References Cited

U.S. PATENT DOCUMENTS 5,699,118 A * 12/1997 Bolton ..................... 375/240.03
7,453,938 B2 * 11/2008 Haskell et al. ........... 375/240.03
(Continued)

OTHER PUBLICATIONS

International Search Report and Written Opinion-PCT/US2012/044394-ISA/EPO-Sep. 19, 2012 (102355WO), 11 pp.
(Continued)

*Primary Examiner* — Dave Czekaj
*Assistant Examiner* — Dramos I Kalapodas
(74) *Attorney, Agent, or Firm* — Shumaker & Sieffert, P.A,

(57) ABSTRACT

This disclosure relates to techniques for preventing or reducing the appearance of undesirable color and/or gray patches in decoded video sequences due to generation of out-of-bound quantized transform coefficients during video encoding. Insufficient compression of a video block according to a selected encoding mode and a selected quantization parameter (QP) value may result in the generation and subsequent clipping of out-of-bound quantized transform coefficients for a given video coding standard. The techniques include predicting whether out-of-bound quantized transform coefficients will be generated for a video block, and adjusting at least one of the selected encoding mode and the selected QP value for the video block to prevent the generation of out-of-bound quantized transform coefficients. According to the techniques, the generation of out-of-bound quantized transform coefficients for a video block may be predicted based on difference parameter threshold values, which may be pre-generated and stored in a video encoder.

40 Claims, 8 Drawing Sheets

(56) References Cited

U.S. PATENT DOCUMENTS

| | | | |
|---|---|---|---|
| 7,933,328 B2* | 4/2011 | DeGarrido et al. | 375/240.03 |
| 8,184,699 B2* | 5/2012 | Krishnan | 375/240.13 |
| 2003/0123539 A1* | 7/2003 | Kim et al. | 375/240.03 |
| 2006/0227867 A1* | 10/2006 | Winger et al. | 375/240.03 |
| 2007/0086523 A1 | 4/2007 | Yan | |
| 2007/0153892 A1* | 7/2007 | Yin et al. | 375/240.03 |
| 2007/0285500 A1* | 12/2007 | Ma et al. | 348/14.07 |
| 2008/0013633 A1* | 1/2008 | Ye et al. | 375/240.24 |
| 2008/0084491 A1* | 4/2008 | He et al. | 348/333.13 |
| 2008/0243971 A1 | 10/2008 | Po et al. | |
| 2009/0175334 A1 | 7/2009 | Ye et al. | |
| 2011/0090960 A1* | 4/2011 | Leontaris et al. | 375/240.12 |
| 2011/0206138 A1* | 8/2011 | Yang | 375/240.26 |
| 2012/0269258 A1* | 10/2012 | Yang et al. | 375/240.02 |

OTHER PUBLICATIONS

Response to Written Opinion issued Sep. 19, 2012, from international application No. PCT/US2012/044394, filed Jun. 4, 2013, 30 pp.

Huang et al., "Macroblock feature and motion involved multi-stage fast inter mode decision algorithm in H.264/AVC video coding," 16th IEEE International Conference on Image Processing (ICIP), 2009, 4 pp.

ITU-T Recommendation H.263, Series H: Audiovisual and Multimedia Systems, Infrastructure of audiovisual services-Coding of moving video, Video coding for low bit rate communication, Jan. 2005, 226 pp.

Information technology—Coding of audio-visual objects—Part 2: Visual; National Standard of Canada CAN/CSA-ISO/IEC 14496-2:05 (ISO/IEC 14496-2:2004), Oct. 2005, 729 pp.

Second Written Opinion from international application No. PCT/US2012/044394, dated Jul. 8, 2013, 6 pp. (102355WO).

Reply to Second Written Opinion dated Jul. 8, 2013, international application No. PCT/US2012/044394, filed Sep. 9, 2013, 25 pp. (102355WO).

International Preliminary Report on Patentability from PCT/US2012/044394 dated Oct. 24, 2013 (22 pages).

* cited by examiner

COLOR/GRAY PATCH PREVENTION FOR VIDEO CODING

TECHNICAL FIELD

This disclosure relates to video coding and, more particularly, video compression techniques.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2; MPEG-4; ITU-T H.263; ITU-T H.263-P0, MPEG-4, Short Video Header; ITU-T H.264/MPEG-4, Part 10, Advanced Video Coding (AVC); or the emerging High Efficiency Video Coding (HEVC) standard, and extensions of such standards, to transmit and receive digital video information more efficiently.

For block-based video coding, a video frame or slice may be partitioned into video blocks, known as macroblocks (MBs) or coding units (CUs). Video compression techniques perform spatial prediction and/or temporal prediction of the video blocks to reduce or remove redundancy between the video blocks that is inherent in video sequences. Video compression techniques also perform transformation and quantization to reduce the amount of data used to represent the predicted video blocks. In some cases, the bit depth of the quantized transform coefficients may still be larger than the range specified by the video coding standard, and an additional clipping may be performed on the out-of-bound quantized transform coefficients to bring them within the specified range. This clipping results in a loss of data in the encoded video blocks, which may cause undesirable color/gray patches to appear in the video sequence when decoded.

SUMMARY

In general, this disclosure relates to techniques for preventing the appearance of undesirable color/gray patches in decoded video sequences due to clipping out-of-bound quantized transform coefficients during video encoding. Insufficient compression of a video block according to a selected encoding mode and a selected quantization parameter (QP) value may result in the generation and subsequent clipping of out-of-bound quantized transform coefficients for a given video coding standard. The techniques of this disclosure include predicting whether out-of-bound quantized transform coefficients will be generated for a video block, i.e., whether out-of-bound clipping will be necessary in addition to quantization, and adjusting at least one of the selected encoding mode and the selected QP value for the video block to prevent the generation of out-of-bound quantized transform coefficients. In this way, the techniques may prevent or reduce the appearance of color/gray patches in a decoded video sequence, and support generation of high video quality at a target video bit-rate.

According to the techniques, in some examples, the generation of out-of-bound quantized transform coefficients for a video block may be predicted based on difference parameter threshold values. More specifically, in some examples, a video encoder may predict that out-of-bound quantized transform coefficients will be generated for a video block when a difference parameter value of the video block exceeds a difference parameter threshold value for the selected encoding mode at the selected QP value. The difference parameter threshold values may be pre-generated and stored in the video encoder. The difference parameter threshold values may, for example, include sum of absolute differences (SAD) threshold values, sum of squared differences (SSD) threshold values, or sum of absolute transformed differences (SATD) threshold values. More specifically, the difference parameter threshold values may comprise minimum pixel value differences between the video block and a predictive video block at which out-of-bound quantized transform coefficients will be generated for a given encoding mode at a given QP value.

In one example, the disclosure is directed to a method of encoding video data, the method comprising selecting an encoding mode for a video block, selecting a quantization parameter (QP) value for the video block, predicting whether out-of-bound quantized transform coefficients will be generated for the video block based on difference parameter threshold values, and when generation of the out-of-bound quantized transform coefficients is predicted, adjusting at least one of the selected encoding mode and the selected QP value for the video block.

In another example, the disclosure is directed to a video encoding device for encoding video data comprising a memory that stores video data, and a processor that selects an encoding mode for a video block, selects a quantization parameter (QP) value for the video block, predicts whether out-of-bound quantized transform coefficients will be generated for the video block based on difference parameter threshold values, and, when generation of the out-of-bound quantized transform coefficients is predicted, adjusts at least one of the selected encoding mode and the selected QP value for the video block.

In a further example, the disclosure is directed to a video encoding device for encoding video data comprising means for selecting an encoding mode for a video block, means for selecting a quantization parameter (QP) value for the video block, means for predicting whether out-of-bound quantized transform coefficients will be generated for the video block based on difference parameter threshold values, and when generation of the out-of-bound quantized transform coefficients is predicted, means for adjusting at least one of the selected encoding mode and the selected QP value for the video block.

In another example, the disclosure is directed to a computer-readable medium comprising instructions for encoding video data that, when executed, cause a programmable processor to select an encoding mode for a video block, select a quantization parameter (QP) value for the video block, predict whether out-of-bound quantized transform coefficients will be generated for the video block based on difference parameter threshold values, and when generation of the out-of-bound quantized transform coefficients is predicted, adjust at least one of the selected encoding mode and the selected QP value for the video block.

The details of one or more examples are set forth in the accompanying drawings and the description below. Other features, objects, and advantages will be apparent from the description and drawings, and from the claims.

DETAILED DESCRIPTION

This disclosure relates to techniques for preventing or reducing the appearance of undesirable color and/or gray patches in decoded video sequences due to out-of-bound quantized transform coefficients during video encoding. Insufficient compression of a video block according to a selected encoding mode and a selected quantization parameter (QP) may result in the generation and subsequent clipping of out-of-bound quantized transform coefficients for a given video coding standard. The techniques of this disclosure include predicting that out-of-bound quantized transform coefficients will be generated for a video block, and adjusting at least one of the selected encoding mode and the selected QP value for the video block to prevent the generation of out-of-bound quantized transform coefficients. In this way, the techniques prevent the appearance of color/gray patches in a decoded video sequence, and achieve high video quality and a target video bit-rate.

Figure 1:
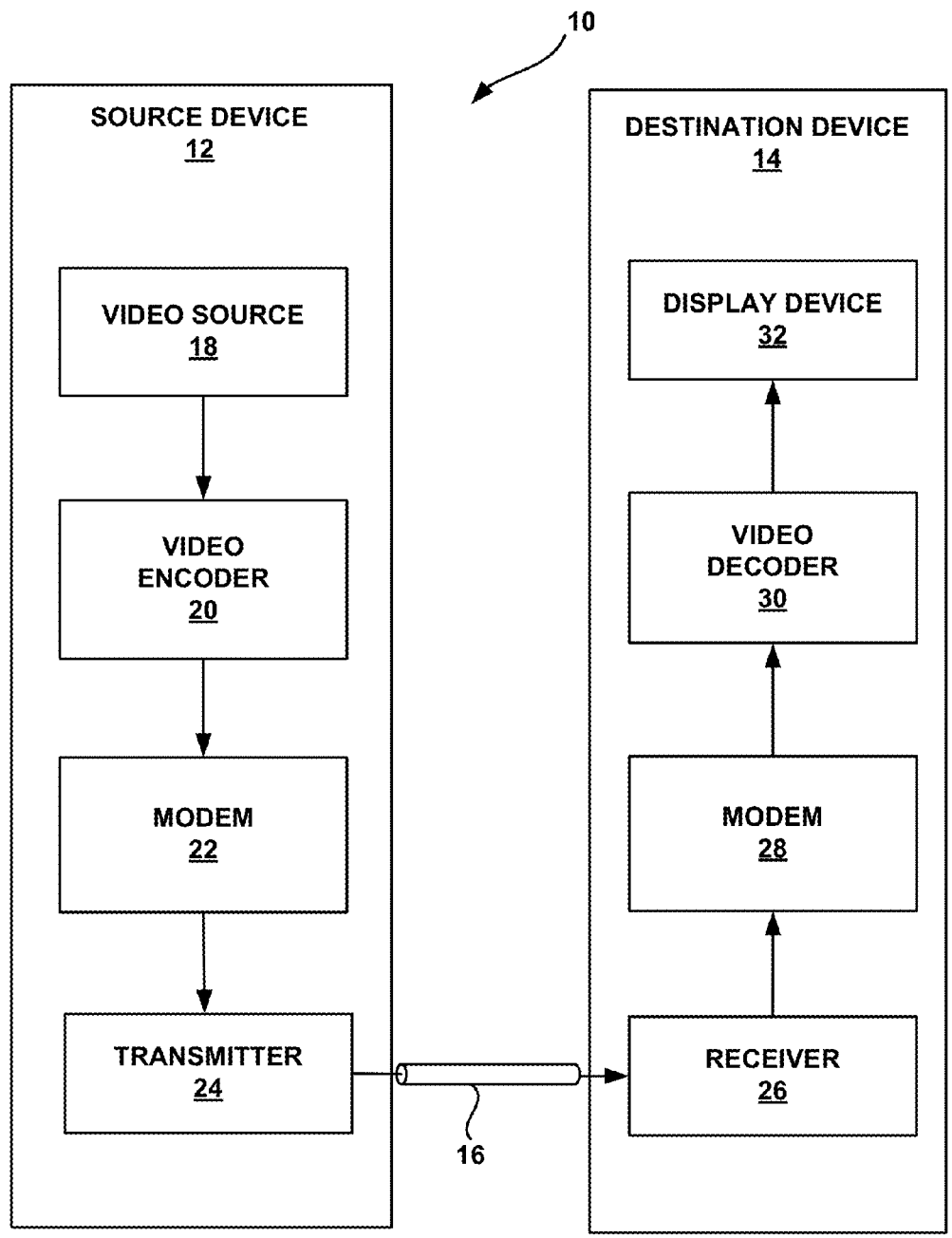
FIG. 1 is a block diagram illustrating an example video encoding and decoding system that may utilize techniques for preventing or reducing color/gray patches in decoded video sequences.

FIG. 1 is a block diagram illustrating an example video encoding and decoding system 10 that may utilize techniques for preventing or reducing color/gray patches in decoded video sequences. As shown in FIG. 1, system 10 includes a source device 12 that transmits encoded video to a destination device 14 via a communication channel 16. Source device 12 and destination device 14 may comprise any of a wide range of devices. In some cases, source device 12 and destination device 14 may comprise wireless communication devices that can communicate video information over a communication channel 16, in which case communication channel 16 is wireless.

The techniques of this disclosure, however, which concern sufficiently compressing video blocks to prevent or reduce the appearance of undesirable color/gray patches in decoded video sequences, are not necessarily limited to wireless applications or settings. For example, these techniques may apply to over-the-air television broadcasts, cable television transmissions, satellite television transmissions, Internet video transmissions, encoded digital video that is encoded onto a storage medium, or other scenarios. Accordingly, communication channel 16 may comprise any combination of wireless or wired media suitable for transmission of encoded video data, and devices 12, 14 may comprise any of a variety of wired or wireless media devices such as mobile telephones, smartphones, digital media players, set-top boxes, televisions, displays, desktop computers, portable computers, tablet computers, gaming consoles, portable gaming devices, or the like.

In the example of FIG. 1, source device 12 includes a video source 18, video encoder 20, a modulator/demodulator (modem) 22 and a transmitter 24. Destination device 14 includes a receiver 26, a modem 28, a video decoder 30, and a display device 32. In other examples, a source device and a destination device may include other components or arrangements. For example, source device 12 may receive video data from an external video source 18, such as an external camera, a video storage archive, a computer graphics source, or the like. Likewise, destination device 14 may interface with an external display device, rather than including an integrated display device.

The illustrated system 10 of FIG. 1 is merely one example. Techniques for efficient coding of prediction information for video blocks may be performed by any digital video encoding and/or decoding device. The techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be modulated by modem 22 according to a communication standard, and transmitted to destination device 14 via transmitter 24. Modem 22 may include various mixers, filters, amplifiers or other components designed for signal modulation. Transmitter 24 may include circuits designed for transmitting data, including amplifiers, filters, and one or more antennas.

In general, during encoding, video encoder 20 performs video compression techniques to reduce the amount of data used to represent encoded video blocks. The video compression techniques include prediction of video blocks according to a selected encoding mode, i.e., inter-encoding or intra-encoding, generation of residual data representative of the difference between a coded block and a predictive block, transform of the residual data to transform coefficients in a transform domain, and quantization of the transform coefficients according to a selected quantization parameter (QP) value, i.e., representative of an amount of spatial detail retained for the video blocks. Insufficient compression of a video block according to the selected encoding mode and the selected QP value may result in the generation and subsequent clipping of out-of-bound quantized transform coefficients for a given video coding standard.

This clipping results in a loss of data in the encoded video block, which may cause undesirable color/gray patches to appear in the video sequence when decoded. The color/gray patches are artifacts that are not part of the original image, but appear in the decoded image due to the reduction of data used to represent the residual video block. For example, when the clipping occurs in chroma blocks, the artifacts may appear as color patches that are inconsistent with the surrounding color in the decoded image. As another example, when the clipping occurs in luma blocks, the artifacts may appear as gray patches that are inconsistent with the surrounding white light in the decoded image.

In accordance with this disclosure, video encoder 20 of source device 12 may be configured to apply the techniques for preventing or reducing the generation of color/gray patches in decoded video sequences. Video encoder 20 may be configured, therefore, to predict whether out-of-bound quantized transform coefficients will be generated for a video block, and adjust at least one of the selected encoding mode and the selected QP value for the video block to prevent the generation of out-of-bound quantized transform coefficients. By adjusting the selected encoding mode and/or QP value for video blocks predicted to generate out-of-bound quantized transform coefficients, video encoder 20 may prevent the appearance of color/gray patches and still generate high video quality at a target video bit-rate.

Video encoder 20 may predict the generation of out-of-bound quantized transform coefficients for a video block based on difference parameter threshold values. The difference parameter threshold values may, for example, include sum of absolute differences (SAD) threshold values, sum of squared differences (SSD) threshold values, or sum of absolute transformed differences (SATD) threshold values. More specifically, the difference parameter threshold values may comprise minimum pixel value differences between the video block and a predictive video block at which out-of-bound quantized transform coefficients will be generated for a given encoding mode at a given QP value. Hence, difference parameter threshold values may be different for different combinations of encoding mode and QP value. In some examples, the difference parameter threshold values may be pre-generated and stored in video encoder 20.

The probability that out-of-bound transform coefficients will be generated for a video block is high when the video block is uncorrelated, i.e., there are large pixel differences between the current video block to be coded and a predictive video block. In the case of an uncorrelated video block, a difference parameter value for the video block, after performing either spatial or temporal prediction, is also high. Difference parameters values, therefore, may be used as an indication of whether out-of-bound coefficients will be generated for a given video block. According to the techniques, video encoder 20 may predict that out-of-bound quantized transform coefficients will be generated for a video block when a difference parameter value of the video block exceeds a difference parameter threshold value for the selected encoding mode at the selected QP value.

Receiver 26 of destination device 14 receives information over channel 16, and modem 28 demodulates the information. The information communicated over channel 16 may include syntax information defined by video encoder 20, which is also used by video decoder 30, that includes syntax elements that describe characteristics and/or processing of macroblocks (MBs), prediction units (PUs), coding units (CUs), or other units of coded video, e.g., video slices, video frames, and video sequences or groups of pictures (GOPs). Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

In accordance with this disclosure, the techniques performed by video encoder 20 to sufficiently compress the video blocks for encoding may prevent the appearance of undesirable color/gray patches in the video sequence when decoded by video decoder 30 and displayed on display device 32. Video decoder 30 may therefore comprise a standard video decoder and need not necessarily be specially configured to effect or utilize the techniques of this disclosure.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14.

Video encoder 20 and video decoder 30 may operate according to a video compression standard, such as the ITU-T H.263-P0, MPEG-4, Short Video Header video coding standard or the ITU-T H.264, MPEG-4, Part 10, Advanced Video Coding (AVC) standard. The techniques of this disclosure, however, are not limited to any particular coding standard. Other examples include MPEG-2, ITU-T H.263, and the emerging High Efficiency Video Coding (HEVC) standard. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The H.263-P0 standard, as an example, was originally designed for low-bit rate, low-resolution video coding when mandated by network bandwidth and/or device size, e.g., mobile telephones, low end video conferencing systems, and surveillance systems. The H.263-P0 standard defines a very limited range of only 8-bit precision for quantized transform coefficients, while transform coefficients are given 12-bit precision. More specifically, the H.263-P0 standard allows a range of [1, 254] for quantized intra DC transform coefficients and a range of [−127, 127] for other quantized transform coefficients, and a range of [−2047, 2047] for transform coefficients. Despite the limited range for quantized transform coefficients, the H.263-P0 standard does not provide a specification-compliant solution to out-of-bound quantized transform coefficients. Instead, when video encoder 20 uses the H.263-P0 video coding standard, any out-of-bound quantized transform coefficients are merely clipped to be within the specified range.

Other video coding standards, such as the ITU-T H.264 AVC standard or the emerging HEVC standard, may include specification-compliant solutions to out-of-bound quantized transform coefficients. Clipping or other data reduction techniques used by these standards, however, may still result in a significant loss of data in the encoded video blocks and cause the appearance of color/gray patches in the decoded video sequence. This is especially true as the demand for high-bit rate, high-quality video coding increases.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. Each of video encoder 20 and video decoder 30 may be included in one or more encoders or decoders, either of which may be integrated as part of a combined encoder/decoder (CODEC) in a respective camera, computer, mobile device, subscriber device, broadcast device, set-top box, server, or the like.

A video sequence typically includes a series of video frames. A GOP generally comprises a series of one or more video frames. Each video frame may include a plurality of slices. Each slice may include a plurality of video blocks that may correspond to macroblocks, partitions of macroblocks, CUs, or PUs in various coding techniques or standards. A GOP may include syntax data in a header of the GOP, a header of one or more frames of the GOP, or elsewhere, that describes a number of frames included in the GOP. Each frame may include frame syntax data or block syntax data that describes an encoding mode and QP value for each video block of the respective frame. Video encoder 20 typically operates on video blocks within individual video frames in order to encode the video data. The video blocks may have fixed or varying sizes, and may differ in size according to a specified coding standard.

As an example, the ITU-T H.263 standard supports inter and intra prediction in fixed block sizes of 16×16 and, in the advanced prediction mode, 8×8. The ITU-T H.264 standard supports intra prediction in various block sizes, such as 16×16, 8×8, or 4×4 for luma components, and 8×8 for chroma components, as well as inter prediction in various block sizes, such as 16×16, 16×8, 8×16, 8×8, 8×4, 4×8 and 4×4 for luma components and corresponding scaled sizes for chroma components. The HEVC standard may support intra and inter prediction in block sizes up to 32×32, 64×64 or 128×128. The HEVC standard provides more efficient and flexible video coding based on coding units (CUs), prediction units (PUs), and transform units (TUs). A CU is a basic unit of compression similar to a macroblock used in the H.263 and H.264 standards. A PU is a unit of inter/intra prediction and there can be multiple PUs in a single CU. A TU is a unit of transform, and can include one or more PUs.

In this disclosure, the term "video block" may refer to any of a macroblock, a partition of a macroblock, a CU, or a PU. Also in this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

In order to perform video compression of a video block, video encoder 20 may first select an encoding mode and a QP value based on a difference parameter value for the video block to be coded and a predictive video block. According to the techniques of this disclosure, in order to prevent the appearance of color/gray patches in the decoded video sequence, video encoder 20 may also predict whether out-of-bound quantized transform coefficients will be generated for the video block at the selected encoding mode and QP value. More specifically, video encoder 20 may predict that out-of-bound quantized transform coefficients will be generated for the video block when the difference parameter value of the video block exceeds a difference parameter threshold value for the selected encoding mode at the selected QP value. In some examples, the difference parameter threshold values may be pre-generated and stored in video encoder 20.

When out-of-bound quantized transform coefficients are predicted to be generated for the video block, video encoder 20 may adjust at least one of the selected encoding mode and the selected QP value for the video block to prevent the generation of out-of-bound quantized transform coefficients. In some cases, video encoder 20 may iteratively adjust the selected encoding mode and/or the selected QP value until the difference parameter value of the video block does not exceed a difference parameter threshold value for a final encoding mode at a final QP value. Video encoder 20 may then use the final encoding mode and the final QP value to sufficiently compress the video block for encoding In this way, video encoder 20 may prevent the appearance of color/gray patches in the decoded video sequence and still achieve high video quality and a target video bit-rate.

Following intra-predictive or inter-predictive coding to produce predictive data and residual data, transformation of the residual data may be performed to generate residual transform coefficients that represent the residual data in a more efficient manner for coding. The transforms may comprise forward or inverse discrete cosine transforms (DCT), integer transforms, wavelet transforms, or another conceptually similar transforms. The residual data may correspond to pixel differences between pixels of a current video block to be encoded and a reference video block.

Following any transforms to produce transform coefficients, quantization of the transform coefficients may be performed. Quantization generally refers to a process in which transform coefficients are quantized to possibly reduce the amount of data used to represent the transform coefficients. The quantization process may reduce the bit depth associated with some or all of the coefficients. For example, an n-bit value may be rounded down to an m-bit value during quantization, where n is greater than m.

Quantization is performed according a QP value that regulates an amount of spatial detail of the video block retained by the transform coefficients after quantization. For example, in the ITU-T H.263 standard, QP values may range between 1 and 31. In the ITU-T H.264 standards and in the emerging HEVC standard, QP values may range between 1 and 51. When a small QP value is selected, the quantized transform coefficients will retain a large amount of the spatial detail and require a large bit precision. In some examples, a small QP value may generate out-of-bound quantized transform coefficients. The occurrence of out-of-bound quantized transform coefficients at different QP values may vary across different encoding modes and across different standards. For example, out-of-bound quantized transform coefficient generation may occur more often at small QP values in the inter-encoding mode of the H263-P0 standard. The intra-encoding mode of the H263-P0 standard, however, is less vulnerable to out-of-bound quantized transform coefficient generation at small QP values than the inter-encoding mode. When a large QP value is selected, the quantized transform coefficients will retain less spatial detail and require less bit precision, but at the cost of increased distortion and reduced quality of the video block.

In some examples, video encoder 20 may utilize a pre-defined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), or another entropy encoding methodology.

Video encoder 20 may further entropy encode syntax data, such as block-based syntax data (e.g., macroblock, partition of macroblock, CU, or PU-based syntax data), slice-based syntax data, frame-based syntax data, and GOP-based syntax data, to video decoder 30, e.g., in a partition header, a block header, a slice header, a frame header, or a GOP header. The frame-based or block-based syntax data may indicate an encoding mode and QP value used to encode each video block included in the corresponding frame. Video decoder 30 may therefore comprise a standard video decoder and need not necessarily be specially configured to effect or utilize the techniques of this disclosure.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). An apparatus including video encoder 20 and/or video decoder 30 may comprise an integrated circuit, a microprocessor, and/or a wireless communication device, such as a cellular telephone.

Figure 2:
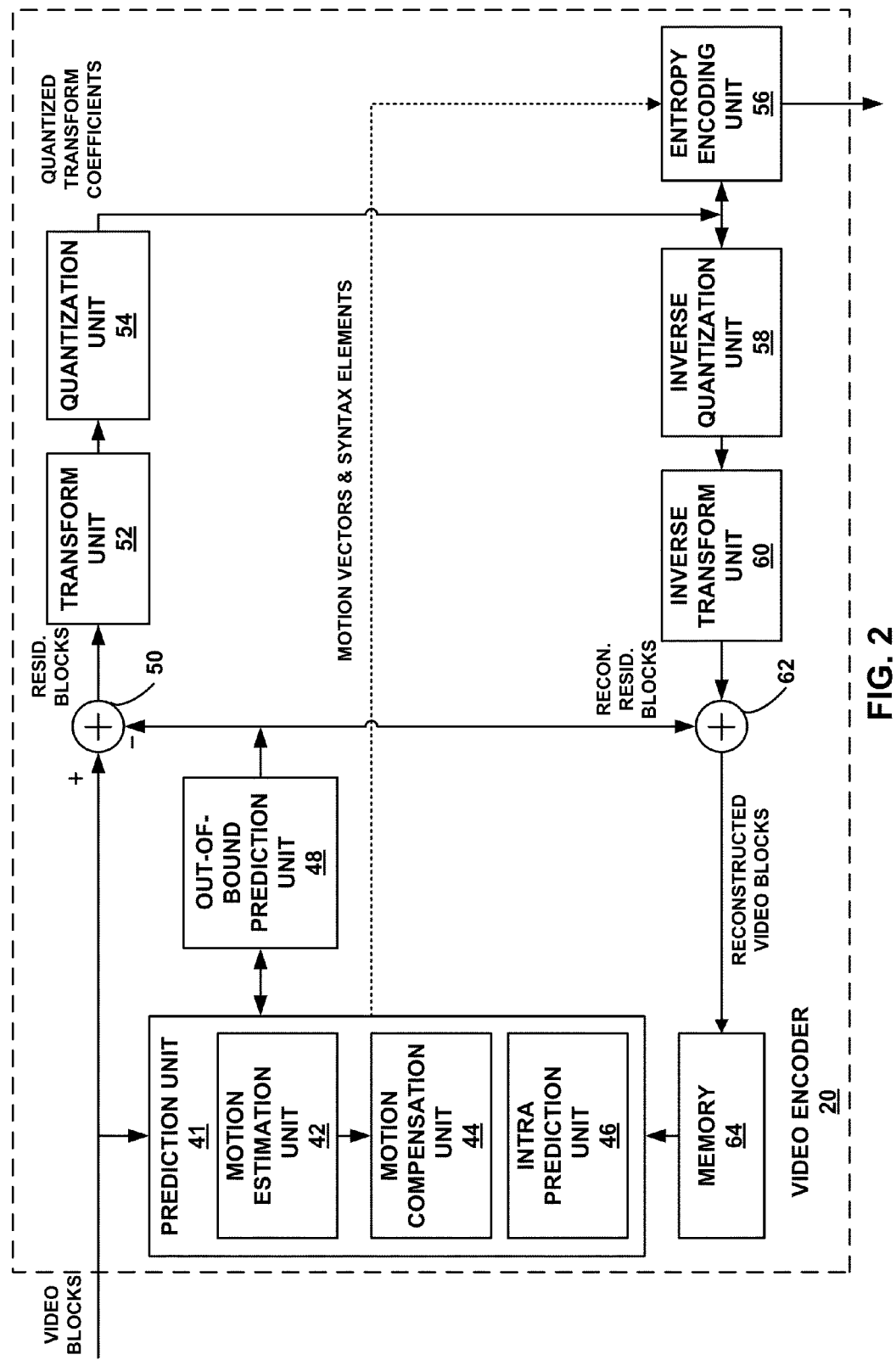
FIG. 2 is a block diagram illustrating an example of a video encoder that may implement techniques for preventing color/gray patches in decoded video sequences.

FIG. 2 is a block diagram illustrating an example of video encoder 20 that may implement techniques for preventing color/gray patches in decoded video sequences. Video encoder 20 performs video compression techniques to reduce the amount of data used to represent encoded video blocks. Insufficient compression of a video block according to a selected encoding mode and a selected quantization parameter (QP) value may result in the generation of out-of-bound quantized transform coefficients for a given video coding standard. The out-of-bound quantized transform coefficients may then be clipped or otherwise reduced to be within the range specified by the video coding standard. This clipping results in a loss of data in the encoded video block, which may cause undesirable color/gray patches to appear in the video sequence when decoded.

The disclosed techniques may be especially applicable to video encoders that use video compression techniques described in the ITU-T H.263-P0, MPEG-4, Short Video Header video coding standard, which was originally designed for low-bit rate video coding and provides no specification compliant solution to out-of-bound quantized transform coefficients. The techniques may also be applicable to other video compression techniques, including ITU-T H.264, MPEG-4, Part 10, Advanced Video Coding (AVC), as the demand for high-bit rate, high-quality video coding increases.

As shown in FIG. 2, video encoder 20 receives a current video block within a video frame to be encoded. In the example of FIG. 2, video encoder 20 includes prediction unit 41, out-of-bound prediction unit 48, summer 50, transform unit 52, quantization unit 54, entropy encoding unit 56, and memory 64. Prediction unit 41 includes motion estimation unit 42, motion compensation unit 44, and intra prediction unit 46. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62.

During the encoding process, video encoder 20 receives a video frame or slice to be encoded. The frame or slice may be divided into multiple video blocks, e.g., CUs or macroblocks. Video encoder 20 then performs video compression techniques to reduce the amount of data used to represent the encoded video blocks. The video compression techniques include prediction of video blocks according to a selected encoding mode, i.e., inter-encoding or intra-encoding, generation of residual data representative of the difference between the video block to be encoded and a predictive block, transform of the residual data to transform coefficients in a transform domain, and quantization of the transform coefficients according to a selected QP value, i.e., representative of an amount of spatial detail retained for the video blocks.

Prediction unit 41 may perform inter-predictive and intra-predictive encoding of a current video block relative to a predictive block. For example, within prediction unit 41, intra prediction unit 46 may perform intra-predictive coding of the current video block to provide spatial compression. Intra-encoding relies on spatial prediction to reduce or remove spatial redundancy in video within a given video frame. Intra-mode (I mode) may refer to any of several spatial based compression modes.

For example, in the ITU-T H.264 standard and in the emerging HEVC standard, intra prediction unit 46 may generate a predictive block of pixel values based on one or more neighboring blocks of pixel values in the same frame or slice as the current block to be encoded. In this case, video encoder 20 may generate a residual block by subtracting the predictive block from the current video block using summer 50. The residual block is than applied to transform unit 52, and the transform coefficients of the residual block are applied to quantization unit 54.

In the ITU-T H.263-P0 standard, however, intra prediction unit 46 may perform spatial compression after quantization by quantization unit 54. More specifically, for the intra-encoding mode, the current video block to be encoded is applied to transform unit 52, and the transform coefficients of the current video block are applied to quantization unit 54. After quantization, intra prediction unit 46 may spatially compress the quantized transform coefficients of the current video block to be encoded relative to one or more neighboring blocks of quantized transform coefficients in the same frame or slice as the current block. With reference to FIG. 2, video encoder 20 may apply no predictive block or may apply a block of zeros to summer 50 to generate the residual block. For example, video encoder 20 may perform no subtraction operation at summer 50, or may subtract the block of zeros from the current video block to be encoded. In either way, the residual block will include the same pixel values as the current video block to be encoded.

Also within prediction unit 41, motion estimation unit 42 and motion compensation unit 44 may perform inter-predictive coding of the current video block relative to a predictive block calculated from one or more reference frames to provide temporal compression. The one or more reference frames may be stored in memory 64. Inter-encoding relies on temporal prediction to reduce or remove temporal redundancy in video within adjacent frames of a video sequence. Inter-modes such as unidirectional prediction (P mode) or bidirectional prediction (B mode) may refer to any of several temporal-based compression modes. Inter-predictive encoding may be performed in substantially the same way for the H.263-P0 standard and the H.264 and emerging HEVC standards.

Quantization unit 54 later quantizes transform coefficients of the predicted video blocks according to a QP value to further reduce bit depth of the encoded video blocks. The QP value determines the degree of quantization and, therefore, the amount of spatial detail retained in the video block after quantization. For example, in the ITU-T H.263-P0 standard, QP values may range between 1 and 31. In the ITU-T H.264 standard and in the emerging HEVC standard, QP values may range between 1 and 51. When the QP value is small, the quantized transform coefficients will retain a large amount of spatial detail and require a large bit precision to represent the coefficients. In some examples, a small QP value may generate out-of-bound quantized transform coefficients. The occurrence of out-of-bound quantized transform coefficients at different QP values may vary across different encoding modes and across different standards. For example, out-of-bound quantized transform coefficient generation may occur more often at small QP values in the inter-encoding mode of the H263-P0 standard because its dynamic range for all quantized transform coefficients (i.e., DC and AC coefficients) of an inter-encoded video block is limited only to [−127, 127]. The intra-encoding mode of the H263-P0 standard is less vulnerable to out-of-bound quantized transform coefficient generation at small QP values than the inter-encoding mode because the DC quantized transform coefficients of an intra-encoded video block have a range of [1, 254], and the AC quantized transform coefficients of an intra-encoding video block have a range of [−127, 127]. When the QP value is large, the quantized transform coefficients will retain less spatial detail and require less bit precision, but at the cost of increased distortion and reduced quality of the video block.

As discussed above, when quantization unit 54 creates out-of-bound quantized transform coefficients, video encoder 20 may clip or otherwise reduce the bit-depth of the coefficients to be within the range specified by the video coding standard. For example, the H.263-P0 standard defines a very limited range of only 8-bit precision for quantized transform coefficients, which allows a range of [1, 254] for quantized intra DC transform coefficients and a range of [−127, 127] for other quantized transform coefficients. Since the H.263-P0 standard does not provide a specification-compliant solution to out-of-bound quantized transform coefficients, any out-of-bound quantized transform coefficients are merely clipped to be within the specified range.

As another example, the ITU-T H.264 AVC standard or the emerging HEVC standard, have larger ranges for quantized transform coefficients and include specification compliant solutions to out-of-bound quantized transform coefficients. The clipping or other data reduction techniques used by these standards, however, may still result in a significant loss of data in the encoded video blocks. Regardless of the video coding standard, the loss of data in the encoded video blocks may result in the appearance of color/gray patches in the video sequence when decoded.

Some solutions to prevent the generation of out-of-bound quantized transform coefficients have resulted in reduced video quality compared to conventionally encoded video sequences. More specifically, the prior solutions may require high minimum QP values for all video blocks, which limit the encoded video quality of the video blocks even for high bit-rate encoding and reduce encoding bit-rates below the target bit-rate for the available bandwidth. In addition, other solutions may require more intra-encoding of video blocks, which may increase encoding bit-rates while not improving the encoded video quality.

According to a study of quantization equations for the ITU-T H.263-P0 standard, encoding video blocks at QP values greater than 7 typically does not generate out-of-bound quantized transform coefficients. In addition, for the ITU-T H.263-P0 standard, the intra-encoding mode is inherently more resistant than the inter-encoding mode, and intra-encoding video blocks typically does not generate out-of-bound quantized transform coefficients at QP values greater than 3. Based on these findings, one solution limits the minimum QP value for all video blocks to 7. Avoiding QP values less than 8 prevents generation of out-of-bound quantized transform coefficients, but also degrades the overall video quality, causing high residuals in the decoded video sequence. Another solution forces the intra-encoding mode for all video blocks with a QP value less than 8, and limits the minimum QP value for the intra-encoded video blocks to 3. This solution also prevents generation of out-of-bound quantized transform coefficients and improves video quality over the first solution, but also increases the encoding cost due to a large number of intra-encoded video blocks while not improving the video quality to the level of conventionally encoded video sequences.

In accordance with this disclosure, video encoder 20 may include an out-of-bound prediction unit 48 configured to predict whether out-of-bound quantized transform coefficients will be generated for a video block. When generation of out-of-bound quantized transform coefficients is predicted for a video block, out-of-bound prediction unit 48 adjusts at least one of the selected encoding mode and the selected QP value for the video block to prevent the generation of out-of-bound quantized transform coefficients. In this way, out-of-bound prediction unit 48 may avoid the use of clipping or other data reduction techniques used to bring out-of-bound quantized transform coefficients within the range specified by the encoding standard, and, therefore, prevent the appearance of undesirable color/gray patches in the video sequence when decoded. Moreover, by adjusting the encoding mode and/or QP value for video blocks predicted to generate out-of-bound quantized transform coefficients, video encoder 20 may prevent the appearance of color/gray patches and still achieve high video quality and the target video bit-rate.

After prediction unit 41 performs inter-predictive and intra-predictive encoding of a current video block relative to a predictive block, prediction unit 41 may calculate difference parameter values based on the pixel differences between the current block to be encoded and the predictive block. As described above, for intra-predictive encoding in the H263-P0 standard, the predictive block may comprise a block of zeros. Prediction unit 41 may calculate difference parameter values for both the inter-encoding mode and the intra-encoding mode. For example, the difference parameter values may be sum of absolute differences (SAD) values, sum of squared differences (SSD) value, sum of absolute transformed differences (SATD) values, or the like. In addition, prediction unit 41 may calculate an initial QP value for the current video block based on the difference parameter values for the video block, a QP value for a previous block or the predictive block, and/or available bits for the video block.

Video encoder 20 may then use the calculated difference parameter values to select an encoding mode for the current video block, and the calculated initial QP value to select a QP value for the current video block. According to the disclosed techniques, out-of-bound prediction unit 48 may be provided to perform the encoding mode and QP value selection operations. As stated above, out-of-bound prediction unit 48 may also predict whether out-of-bound quantized transform coefficients will be generated for the video block, and adjust at least one of the selected encoding mode and the selected QP value for the video block to prevent the generation of out-of-bound quantized transform coefficients.

The probability that out-of-bound transform coefficients will be generated for a video block is high when the video block is uncorrelated, i.e., there are large pixel differences between the current video block and a reference video block. In the case of an uncorrelated video block, prediction unit 41 will calculate a high difference parameter value for the video block after performing predictive encoding of the video block. Therefore, out-of-bound prediction unit 48 may use the difference parameter values calculated by prediction unit 41 to predict whether out-of-bound coefficients will be generated for the current video block. More specifically, out-of-bound prediction unit 48 may compare the difference parameter values calculated for the current video block to difference parameter threshold values.

According to the techniques, out-of-bound prediction unit 48 may predict that out-of-bound quantized transform coefficients will be generated for the current video block when the difference parameter value of the video block exceeds a difference parameter threshold value for the selected encoding mode at the selected QP value. The difference parameter threshold value comprises the minimum difference parameter value at which out-of-bound quantized transform coefficients are generated for the selected encoding mode at the selected QP value. Therefore, if the difference parameter value of the current video block exceeds this threshold value, out-of-bound quantized transform coefficients will be generated for the video block.

Difference parameter threshold values for each encoding mode at different QP values may be pre-generated and stored in video encoder 20. For example, the difference parameter threshold values may be stored in memory 64 or another memory within video encoder 20 or within out-of-bound prediction unit 48. In some case, the difference parameter threshold values for each encoding mode, inter and intra, may be indexed in a table or buffer by QP value. In this way, out-of-bound prediction unit 48 may retrieve the difference parameter threshold value for a given encoding mode at a given QP value. The difference parameter threshold values may, for example, include SAD threshold values, SSD threshold values, SATD threshold values, or the like.

The difference parameter threshold values may be pre-generated based on profiling video data according to a training set of different QP values for the respective encoding modes. As an example, the training set may hold a QP value constant over a sequence of video blocks for each of a plurality of video clips in order to collect a minimum difference parameter value that causes generation of out-of-bound quantized transform coefficients after quantization of the video blocks at that QP value. A difference parameter threshold value at that QP value may then be set as a value less than the absolute minimum of the collected minimum difference parameter values for all the video clips. The profiling results may vary based on the hardware implementation of video encoder 20 and the video compression techniques used by video encoder 20. Separate difference parameter threshold values may, therefore, need to be generated for each different video encoder depending on the implementation and video coding standard.

When out-of-bound quantized transform coefficients are predicted to be generated for the video block, out-of-bound prediction unit 48 may adjust at least one of the selected encoding mode and the selected QP value for the video block to prevent the generation of out-of-bound quantized transform coefficients. In some cases, out-of-bound prediction unit 48 may iteratively adjust the selected encoding mode and/or the selected QP value until the difference parameter value of the video block does not exceed a difference parameter threshold value for a final encoding mode at a final QP value. Video encoder 20 may then use the final encoding mode and the final QP value to sufficiently compress the video block for encoding without the appearance of color/gray patched in the video sequence when decoded.

For example, out-of-bound prediction unit 48 may, first, predict the generation of out-of-bound quantized transform coefficients for the video block based on the selected encoding mode and the calculated initial QP value, and adjust the selected encoding mode. When out-of-bound quantized transform coefficients are predicted, out-of-bound prediction unit 48 may adjust the selected inter-encoding mode to the intra-encoding mode, which is less prone to out-of-bound coefficient generation than the inter-encoding mode. Once the final encoding mode is determined for the video block, out-of-bound prediction unit 48 may, second, predict the generation of out-of-bound quantized transform coefficients for the video block based on the final encoding mode and the selected QP value, and adjust the selected QP value. Out-of-bound prediction unit 48 may adjust the selected QP value by iteratively incrementing the selected QP value until out-of-bound quantized transform coefficients are no longer predicted for the video block at the incremented QP value.

In another example, out-of-bound prediction unit 48 predict the generation of out-of-bound quantized transform coefficients for the video block based on the selected encoding mode and the selected QP value, and simultaneously adjust the selected encoding mode and the selected QP value. Out-of-bound prediction unit 48 may iteratively adjust both the selected encoding mode and the selected QP value searching for a best fit between the inter and intra encoding modes and the full range of QP values until out-of-bound quantized transform coefficients are no longer predicted. This example operation may require many iterations and comparisons to the difference parameter threshold tables.

Out-of-bound prediction unit 48 in video encoder 20 prevents the appearance of color/gray patches in the decoded video sequence while still achieving the high video quality and the targeted video bit-rate of a conventional encoder. For example, out-of-bound prediction unit 48 enables video encoder 20 to maintain the target bit-rate, improve the peak signal-to-noise ratio (PSNR), and use the entire range of QP values. These encoder quality metrics may be achieved because, instead of blindly limiting the QP value or switching to the intra-encoding mode, out-of-bound prediction unit 48 predicts whether out-of-bound quantized transform coefficients will be generated, and only then adjusts the selected encoding mode and/or QP value until the out-of-bound quantized transform coefficients are no longer predicted. In some cases, the disclosed techniques may save bits during encoding of a certain block or frame, and use the accumulated bit-savings to improve the video quality of subsequent video blocks or frames. For example, the additional available bits may enable out-of-bound prediction unit 48 to originally select a lower QP value for a subsequent video block.

After out-of-bound prediction unit 48 determines a final encoding mode and QP value for the current video block, prediction unit 41 perform predictive encoding of the current video block according to the final encoding mode. For example, intra prediction unit 46 may perform intra-encoding of the current video block relative to a predictive block generated from neighboring blocks in the same frame or slice as the current video block to provide spatial compression. As described above, for intra-predictive encoding in the H263-P0 standard, the predictive block may be generated after quantization. As another example, motion estimation unit 42 and motion compensation unit 44 may perform inter-encoding of the current video block relative to a predictive block generated from one or more reference frames from memory 64 to provide temporal compression.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a video block within a current video frame relative to a predictive block within a reference frame. The predictive block is the block that is found to most closely match the video block to be encoded in terms of pixel difference, which may be determined by SAD values, SSD values, SATD values, or other difference parameter values. In some examples, video encoder 20 may calculate values for sub-integer pixel positions of reference frames stored in memory 64. For example, video encoder 20 may calculate values of one-quarter pixel positions, one-eighth pixel positions, or other fractional pixel positions of the reference frame. Therefore, motion estimation unit 42 may perform a motion search relative to the full pixel positions and fractional pixel positions and output a motion vector with fractional pixel precision.

Motion estimation unit 42 sends the calculated motion vector to entropy encoding unit 56 and motion compensation unit 44. Motion compensation, performed by motion compensation unit 44, may involve fetching or generating the predictive block based on the motion vector determined by motion estimation. Motion compensation unit 44 may also generate syntax elements defined to represent the prediction information, including the selected encoding mode and QP value for a current video block. Entropy encoding unit 56 may then encode the prediction information as the syntax elements and signal the syntax elements to video decoder 30.

After predictive encoding of the video block, video encoder 20 then forms a residual video block by subtracting the predictive block for the final encoding mode from the current video block. The residual video block contains pixel difference values between the pixels of the current video block to be coded and the predictive block. The pixel difference value may include luma and chroma difference values. Summer 50 represents the component or components that perform this subtraction operation. Transform unit 52 applies a transform, such as a discrete cosine transform (DCT) or a conceptually similar transform, to the residual video block, producing a video block comprising residual transform coefficients. The transform may convert the residual block from a pixel domain to a transform domain, such as a frequency domain.

Transform unit 52 may send the resulting transform coefficients to quantization unit 54. Quantization unit 54 quantizes the transform coefficients according to the final QP value for the video block to further reduce bit-rate. The quantization process may reduce the bit depth associated with some or all of the coefficients. The QP value determines the degree of quantization and, therefore, the amount of spatial detail of the video block retained by the transform coefficients after quantization.

In some examples, quantization unit 54 may then perform a scan of the matrix including the quantized transform coefficients. Alternatively, entropy encoding unit 56 may perform the scan. Following quantization, entropy encoding unit 56 entropy codes the quantized transform coefficients. For example, entropy encoding unit 56 may perform context adaptive variable length coding (CAVLC), context adaptive binary arithmetic coding (CABAC), or another entropy encoding technique. Following the entropy encoding by entropy encoding unit 56, the encoded bitstream may be transmitted to a video decoder, such as video decoder 30, or archived for later transmission or retrieval.

Entropy encoding unit 56 may also entropy encode the motion vectors and the other syntax elements for the current video block being coded. For example, entropy encoding unit 56 may construct header information that includes appropriate syntax elements generated by motion compensation unit 44, such as the final encoding mode and the final QP value for the video block, for transmission in the encoded bitstream. To entropy encode the syntax elements, entropy encoding unit 56 may perform CABAC and binarize the syntax elements into one or more binary bits based on a context model. Entropy encoding unit may also perform CAVLC and encode the syntax elements as codewords according to probabilities based on context.

A video decoder, such as video decoder 30, may use these syntax elements to retrieve the predictive blocks and reconstruct the original video blocks encoded by video encoder 20. For example, the syntax elements may indicate the final encoding modes and final QP values used to sufficiently compress the video blocks to prevent the generation and clipping of out-of-bound quantized transform coefficients in video encoder 20. Video decoder 30 may then decode the video blocks based on the indicated encoding modes and QP values to prevent the appearance of undesirable color/gray patches in the decoded video sequence Inverse quantization unit 58 and inverse transform unit 60 apply inverse quantization and inverse transformation, respectively, to reconstruct the residual block in the pixel domain for later use as a reference block of a reference frame. Motion compensation unit 44 may calculate a reference block by adding the residual block to a predictive block for the selected encoding mode stored in memory 64. Motion compensation unit 44 may also apply one or more interpolation filters to the reconstructed residual block to calculate sub-integer pixel values for use in motion estimation. Summer 62 adds the reconstructed residual block to the predictive block to produce a reference block for storage in memory 64. The reference block may be used by motion estimation unit 42 and motion compensation unit 44 as a reference block to inter-predict a block in a subsequent video frame.

For intra-predictive encoding in the H263-P0 standard, video encoder 20 may apply no predictive block or may apply a block of zeros to summer 62 to generate the reconstructed video block from the reconstructed residual block. For example, video encoder 20 may perform no addition operation at summer 62, or may add the block of zeros to the reconstructed residual block. In either way, the reconstructed video block will include the same reconstructed pixel values as the inverse transformed residual block.

The disclosed techniques may have a cumulative effect of increasing video encoding quality in subsequent video blocks by creating more accurate reference blocks. As described above, preventing generation of out-of-bound quantized transform coefficients also prevents the appearance of color/gray patches in a video sequence when decoded. The color/gray patches may appear after decoding by any decoder, such as video decoder 30 or the decoder within video encoder 20 used to reconstruct the video blocks for use as reference blocks. Eliminating the color/gray patches from the reference video blocks, therefore, may improve encoding quality and further reduce bit depth of the subsequent video blocks.

Figure 3:
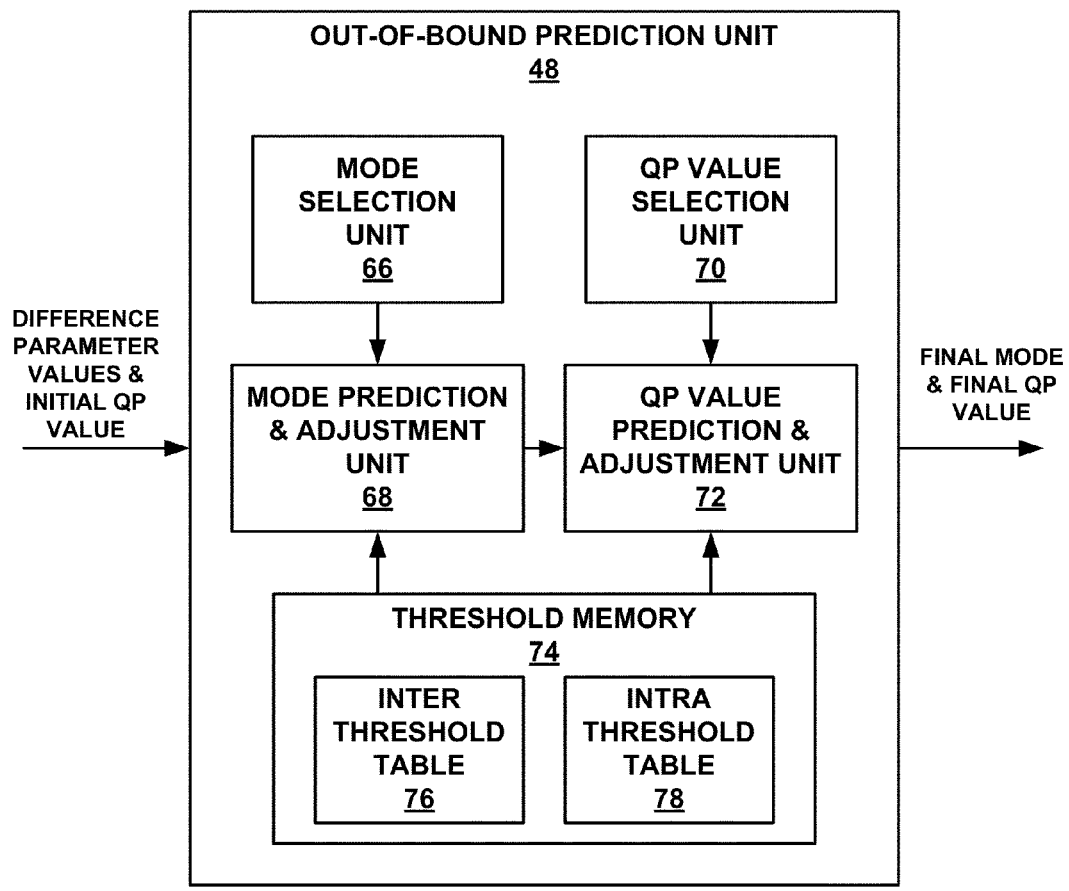
FIG. 3 is a block diagram illustrating exemplary functional units of an out-of-bound prediction unit within the video encoder from FIG. 2.

FIG. 3 is a block diagram illustrating exemplary functional units of out-of-bound prediction unit 48 within video encoder 20 from FIG. 2. As described above, out-of-bound prediction unit 48 prevents the appearance of undesirable color/gray patches in decoded video sequences by predicting generation of out-of-bound quantized transform coefficients, and adjusting at least one of a selected encoding mode and a selected QP value for a video block to prevent the generation of out-of-bound quantized transform coefficients. In this way, out-of-bound prediction unit 48 may prevent the appearance of color/gray patches in a decoded video sequence while achieving high video quality and a target video bit-rate.

In the example illustrated in FIG. 3, out-of-bound prediction unit 48 includes a mode selection unit 66, a mode prediction and adjustment unit 68, a QP value selection unit 70, a QP value prediction and adjustment unit 72, and a threshold memory 74. Threshold memory 74 in out-of-bound prediction unit 48 includes an inter threshold table 76 and an intra threshold table 78. In one example, described in more detail below, the illustrated functional units of out-of-bound prediction unit 48 may be executed to first adjust a selected encoding mode of a video block when out-of-bound quantized transform coefficients are predicted, and second adjust a selected QP value using an iterative process until out-of-bound quantized transform coefficients are no longer predicted. In other examples, out-of-bound prediction unit 48 may include different functional units and/or execute the functional units according to a different operation.

Inter threshold table 76 and intra threshold table 78 may be pre-generated and stored in threshold memory 74 of out-of-bound prediction unit 48. In other examples, inter threshold table 76 and intra threshold table 78 may be stored in memory 64, or another memory, of video encoder 20. Inter threshold table 76 may store difference parameter threshold values at which out-of-bound quantized transform coefficients are generated for the inter-encoding mode at different QP values. Similarly, intra threshold table 76 may store difference parameter threshold values at which out-of-bound quantized transform coefficients are generated for the intra-encoding mode at each of a plurality of difference QP values.

Each of threshold tables 76 and 78 may be pre-generated based on profiling video data according to a training set of different QP values for the respective encoding modes. As an example, the training set may hold a QP value constant over a sequence of video blocks for each of a plurality of video clips in order to collect a minimum difference parameter value that causes generation of out-of-bound quantized transform coefficients after quantization of the video blocks at that QP value. A difference parameter threshold value at that QP value may then be set as a value less than the absolute minimum of the collected minimum difference parameter values for all the video clips. The training set may perform the same operation for different QP values at which out-of-bound quantized transform coefficients may be generated. For example, inter threshold table 76 and intra threshold table 78 may store difference parameter threshold values at all QP values less than or equal to 8.

Tables 1 and 2, below, provide exemplary results of profiling video data at different QP values. More specifically, table 1 provides minimum sum of absolute differences (SAD) values for video blocks in the video clips at which out-of-bound quantized transform coefficients were generated using the inter-encoding mode at QP values 1 through 8. Table 2 provides minimum SAD values for video blocks in the video clips at which out-of-bound quantized transform coefficients were generated using the intra-encoding mode at QP values 1 through 8. For each of the QP values, an absolute minimum SAD value (Min SAD) is determined from the minimum SAD values of the video clips at that QP value. A SAD threshold value at each of the QP values is then set as a rounded value less than the absolute minimum SAD value.

As shown in Tables 1 and 2, the minimum SAD values for the video clips at each QP value fall into definitive bands making SAD threshold values at each QP value easily identifiable. The blanks in Tables 1 and 2 indicate that there were no out-of-bound quantized transform coefficients generated for the video clips at those QP values. For example, in Table 1, no out-of-bound quantized transform coefficients were generated in any of the video clips for the inter-encoding mode at QP values greater than 5. In Table 2, no out-of-bound quantized transform coefficients were generated in any of the video clips for the intra-encoding mode at QP values greater than 3. The SAD threshold values included in the "Inter-SAD thresholds" row of Table 1 may then be stored in inter threshold table 76 and indexed by QP value. Similarly, the SAD threshold values included in the "Intra-SAD thresholds" row of Table 2 may be stored in intra threshold table 78 and indexed by QP value.

Tables 1 and 2 provide exemplary profiling results from an encoder using the hardware implementation illustrated in FIGS. 2 and 3, and the video compression techniques included in the ITU-T H.263-P0, MPEG-4, Short Video Header standard. The profiling results may vary based on the hardware implementation of the video encoder and the video compression techniques used by the video encoder. Different threshold tables will, therefore, need to be generated for each video encoder depending on the implementation and video standard used by the particular video encoder. In addition, threshold tables may be generated using difference parameter values other than SAD values, such as sum of squared differences (SSD) values and sum of absolute transform differences (SATD) values.

TABLE 1

Table 1: Minimum Inter-SAD Values of 8 × 8 video blocks that generate out-of-bound quantized transform coefficients at different QP values.
Minimum Inter-SAD Values at Different QP Values

| Clip | Qp = 1 | Qp = 2 | Qp = 3 | Qp = 4 | Qp = 5 | Qp = 6 | Qp = 7 | Qp = 8 |
|---|---|---|---|---|---|---|---|---|
| Racer | 2747 | 5869 | 8826 | 13363 | | | | |
| Action | 2371 | 5625 | 11800 | | | | | |
| Stefan | 2965 | 5190 | 10036 | | | | | |
| Ckbd | 2156 | 4466 | 6776 | 11545 | | | | |

TABLE 1-continued

Table 1: Minimum Inter-SAD Values of 8 × 8 video blocks that generate out-of-bound quantized transform coefficients at different QP values.

| Clip | Qp = 1 | Qp = 2 | Qp = 3 | Qp = 4 | Qp = 5 | Qp = 6 | Qp = 7 | Qp = 8 |
|---|---|---|---|---|---|---|---|---|
| 6270_qcif | 2169 | 5579 | 8751 | 12578 | 19628 | | | |
| Min SAD | 2156 | 4466 | 6776 | 11545 | 19628 | | | |
| Inter-SAD Thresholds | 2000 | 4000 | 6000 | 11000 | 19000 | | | |

TABLE 2

Table 2: Minimum Intra-SAD Values of 8 × 8 video blocks that generate out-of-bound quantized transform coefficients at different QP values.

| Clip | Qp = 1 | Qp = 2 | Qp = 3 | Qp = 4 | Qp = 5 | Qp = 6 | Qp = 7 | Qp = 8 |
|---|---|---|---|---|---|---|---|---|
| Racer | 3794 | 8474 | 12655 | | | | | |
| Action | 4441 | 12262 | | | | | | |
| Stefan | 5322 | 9226 | | | | | | |
| Ckbd | 4704 | | | | | | | |
| 6270_qcif | 3224 | 8420 | | | | | | |
| Min Sad | 3224 | 8420 | 12655 | | | | | |
| Intra-SAD Thresholds | 3000 | 8000 | 12000 | | | | | |

As described above with reference to FIG. 2, out-of-bound prediction unit 48 receives difference parameter values and an initial QP value for a current video block from prediction unit 41. Mode selection unit 66 in out-of-bound prediction unit 48 selects an encoding mode for the video block based on the difference parameter values for the video block. For example, mode selection unit 66 may select the inter-encoding mode or the intra-encoding mode for the video block depending on which of the modes is associated with the smallest difference parameter value. In some cases, mode selection unit 66 may select an inter- or intra-encoding partition size, and/or a directional intra-encoding mode for the video block. QP value selection unit 70 in out-of-bound prediction unit 48 selects a QP value for the video block based on the initial QP value and/or the difference parameter values of the video block. For example, QP value selection unit 70 may select a small QP value if the initial QP value is small and the difference parameter values are small.

Out-of-bound prediction unit 48 may also predict whether out-of-bound quantized transform coefficients will be generated for the video block, and adjust at least one of the selected encoding mode and the selected QP value for the video block to prevent the generation of out-of-bound quantized transform coefficients. In some cases, out-of-bound prediction unit 48 may only perform the prediction and adjustment operations when the selected QP value is less than a specific value, below which generation of out-of-bound quantized transform coefficients is more prevalent. For example, based on Tables 1 and 2 above, out-of-bound prediction unit 48 may only perform the prediction and adjustment operations when the selected QP value is less than 8.

In the illustrated example of FIG. 3, mode prediction and adjustment unit 68 first adjusts a selected encoding mode of a video block when out-of-bound quantized transform coefficients are predicted, and then QP value prediction and adjustment unit 72 adjusts a selected QP value using an iterative process until out-of-bound quantized transform coefficients are no longer predicted. More specifically, mode prediction and adjustment unit 68 predicts whether out-of-bound quantized transform coefficients will be generated for the video block based on the selected encoding mode and the calculated initial QP value, and only adjusts the selected encoding mode when out-of-bound coefficients are predicted. When out-of-bound coefficients are predicted for the video block, mode prediction and adjustment unit 68 may adjust the selected encoding mode from the inter-encoding mode to the intra-encoding mode.

For example, when mode selection unit 66 selects the intra-encoding mode for the video block, mode prediction and adjustment unit 68, by default, predicts that out-of-bound quantized transform coefficients will not be generated for the video block. As described above and illustrated by Tables 1 and 2, the intra-encoding mode is inherently more resistant to out-of-bound coefficient generation than the inter-encoding mode, and typically does not generate out-of-bound quantized transform coefficients unless the QP value is very low, e.g., less than or equal to 3. In this case, mode prediction and adjustment unit 68 sets the intra-encoding mode as the final encoding mode for the video block. Although out-of-bound quantized transform coefficients are not predicted to be generated for the intra-encoding mode, QP value prediction and adjustment unit 72 may perform the prediction determination for the video block in the intra-encoding mode at the selected QP value for the video block.

When mode selection unit 66 selects the inter-encoding mode for the video block, mode prediction and adjustment unit 68 determines whether out-of-bound quantized transform coefficients will be generated for the video block based on a difference parameter threshold value for the initial QP value. Mode prediction and adjustment unit 68 compares the difference parameter value of the video block for the inter-encoding mode to the difference parameter threshold value for the inter-encoding mode at the initial QP value. Mode prediction and adjustment unit 68 may retrieve the difference parameter value from inter threshold table 76 based on the initial QP value.

When the difference parameter value of the video block is less than the difference parameter threshold value for the inter-encoding mode at the initial QP value, mode prediction and adjustment unit 68 predicts that out-of-bound quantized transform coefficients will not be generated for the video block. In this case, mode prediction and adjustment unit 68 sets the inter-encoding mode as the final encoding mode for the video block. Although out-of-bound quantized transform coefficients are not predicted to be generated for the video block at the initial QP value, QP value prediction and adjustment unit 72 may perform the prediction determination again for the video block in the inter-encoding mode at the selected QP value for the video block.

On the other hand, when the difference parameter value of the video block is greater than the difference parameter threshold value for the inter-encoding mode at the initial QP value, mode prediction and adjustment unit 68 predicts that out-of-bound quantized transform coefficients will be generated for the video block. Mode prediction and adjustment unit 68 then adjusts the selected inter-encoding mode to the intra-encoding mode. Mode prediction and adjustment unit 68 sets the intra-encoding mode as the final encoding mode for the video block. Mode prediction and adjustment unit 68 sends the final encoding mode to QP value prediction and adjustment unit 72.

Once the final encoding mode is determined, QP value prediction and adjustment unit 72 predicts whether out-of-bound quantized transform coefficients will be generated for the video block based on the final encoding mode and the selected QP value, and only adjusts the selected QP value when out-of-bound coefficients are predicted. When out-of-bound coefficients are predicted for the video block, QP value prediction and adjustment unit 72 may adjust the selected QP value by iteratively incrementing the selected QP value until out-of-bound quantized transform coefficients are no longer predicted for the video block at the incremented QP value.

QP value prediction and adjustment unit 72 determines whether out-of-bound quantized transform coefficients will be generated for the video block based on a difference parameter threshold value for the final encoding mode at the selected QP value. QP value prediction and adjustment unit 72 compares the difference parameter value of the video block for the final encoding mode to the difference parameter threshold value for the final encoding mode at the selected QP value. QP value prediction and adjustment unit 72 may retrieve the difference parameter value from either inter threshold table 76 or inter threshold table 78, depending on the final encoding mode, based on the selected QP value.

When the difference parameter value of the video block is less than the difference parameter threshold value for the final encoding mode at the selected QP value, QP value prediction and adjustment unit 72 predicts that out-of-bound quantized transform coefficients will not be generated for the video block. In this case, QP value prediction and adjustment unit 72 sets the selected QP value as the final QP value for the video block.

On the other hand, when the difference parameter value of the video block is greater than the difference parameter threshold value for the final encoding mode at the selected QP value, QP value prediction and adjustment unit 72 predicts that out-of-bound quantized transform coefficients will be generated for the video block. QP value prediction and adjustment unit 72 then adjusts the selected QP value.

For example, QP value prediction and adjustment unit 72 may iteratively increment the selected QP value. The selected QP value may be incremented by steps of 1, or by larger steps or variable steps. For each iteration, QP value prediction and adjustment unit 72 again performs a comparison of the difference parameter value of the video block for the final encoding mode to a difference parameter threshold value for the final encoding mode at the incremented QP value. For this comparison, QP value prediction and adjustment unit 72 may retrieve the difference parameter value from either inter threshold table 76 or inter threshold table 78, depending on the final encoding mode, based on the incremented QP value. QP value prediction and adjustment unit 72 may continue this iterative process until the difference parameter value of the video block is less than the difference parameter threshold value for the final encoding mode at the incremented QP value. QP value prediction and adjustment unit 72 then sets the adjusted QP value as the final QP value for the video block.

As another specific example, assume out-of-bound prediction unit 48 receives an inter-SAD value equal to 5,000, an intra-SAD value equal to 10,000, and an initial QP value of 3 for a video block from prediction unit 41. Moreover, assume mode selection unit 66 selects the inter-encoding mode for the video block, and QP value selection unit 70 selects a QP value equal to 2. In accordance with the operation described above, mode prediction and adjustment unit 68 would retrieve an inter-SAD threshold value from inter threshold table 76 at the initial QP value of 3, which according to Table 1 is equal to 6,000. Mode prediction and adjustment unit 68 then predicts that out-of-bound quantized transform coefficients will not be generated for the video block because the inter-SAD value (5,000) for the video block is less than the inter-SAD threshold value at the initial QP value (6,000). Mode prediction and adjustment unit 68 sets the inter-encoding mode as the final encoding mode.

QP prediction and adjustment unit 72 would then retrieve an inter-SAD threshold value from inter threshold table 76 at the selected QP value of 2, which according to Table 1 is equal to 4,000. QP value prediction and adjustment unit 72 then predicts that out-of-bound quantized transform coefficients will be generated for the video block because the inter-SAD value (5,000) for the video block exceeds the inter-SAD threshold value at the selected QP value (4,000). QP value prediction and adjustment unit 72 increments the selected QP value from a value of 2 to a value of 3. QP value prediction and adjustment unit 72 then performs a second comparison and predicts that out-of-bound quantized transform coefficients will not be generated for the video block because the inter-SAD value (5,000) for the video block is less than the inter-SAD threshold value at the incremented QP value (6,000). QP value prediction and adjustment unit 72 sets the incremented QP value of 3 as the final QP value.

Mode prediction and adjustment unit 68 and QP value prediction and adjustment unit 72 may be implemented in within out-of-bound prediction unit 48 in at least three different configurations. In one configuration, only one of mode prediction and adjustment unit 68 and QP value prediction and adjustment unit 72 may be included in out-of-bound prediction unit 48 such that only the selected encoding mode of the video block or only the selected QP value for the video block may be adjusted. In another configuration, mode prediction and adjustment unit 68 and QP value prediction and adjustment unit 72 may be executed in serial, as illustrated in FIG. 3. In this example, QP value prediction and adjustment unit 72 may only adjust the selected QP value for the video block after mode prediction and adjustment unit 68 determines the final encoding mode of the video block, and cannot go back and further adjust the encoding mode of the video block. In a further configuration, mode prediction and adjustment unit 68 and QP value prediction and adjustment unit 72 may be integrated in a hybrid unit that adjusts both the selected encoding mode and the selected QP value of the video block to select the best mode and QP value pair that enables high video quality after evaluating all the possible mode and QP value pairs that do not cause out-of-bound quantized transform coefficients at given difference parameter values. In some cases, the hybrid configuration may be flexible enough to be used by different encoding standards, such as the H264 standard. In the illustrated serial configuration for the H263-P0 standard, out-of-bound prediction unit 48 may execute the functional blocks illustrated in FIG. 3 according to the following algorithm when mode selection unit 66 selects the inter-encoding mode. In some cases, out-of-bound prediction unit 48 may only execute the following algorithm when the selected QP value is less than 8.

```
If (inter SAD > inter_sad_threshold_table[Qp])
{
    Pre-Detected Out of Bound Coefficient
    Mode_Correction_Block (original_mode);
    QP_Correction_Block (final_mode, Qp, inter_sad, intra_sad);
}
Else
{
    Regular Mode & Qp decision;
}
Mode_Correction_Block (original_mode)
/* determines final encoding mode */
/* This is only an example algorithm of the serial configuration for the
H263-P0 encoding standard. This algorithm may be implemented using a
hybrid configuration to select the best encoding mode by comparing the
inter- & intra-SAD values against their respective thresholds at a given QP
value, and performing the same iterations at next higher QP value if both
modes are not possible at the given QP value. */
{
    If (original_mode == inter)
        final_mode = intra;
}
QP_Correction_Block (final_mode, Qp, inter_sad, intra_sad)
/* determines final QP value */
{
    final_qp = Qp;
    if (final_mode == intra)
    {
        while (intra_sad >= intra_sad_threshold_table[final_qp])
        {
            final_qp++;
        }
    }
    Else
    {
        while (inter_sad >= inter_sad_trheshold_table[final_qp])
        {
            final_qp++;
        }
    }
}
```

In this way, out-of-bound prediction unit 48 enables video encoder 20 to predict the generation of out-of-bound quantized transform coefficients for a video block and iteratively adjust at least one of the selected encoding mode and the selected QP value for the video block until out-of-bound quantized transform coefficients are no longer predicted. In this way, video encoder 20 may sufficiently compress the video block for encoding to prevent the appearance of color/gray patches in the video sequence when decoded, and still achieve high video quality and a target video bit-rate.

Figure 4:
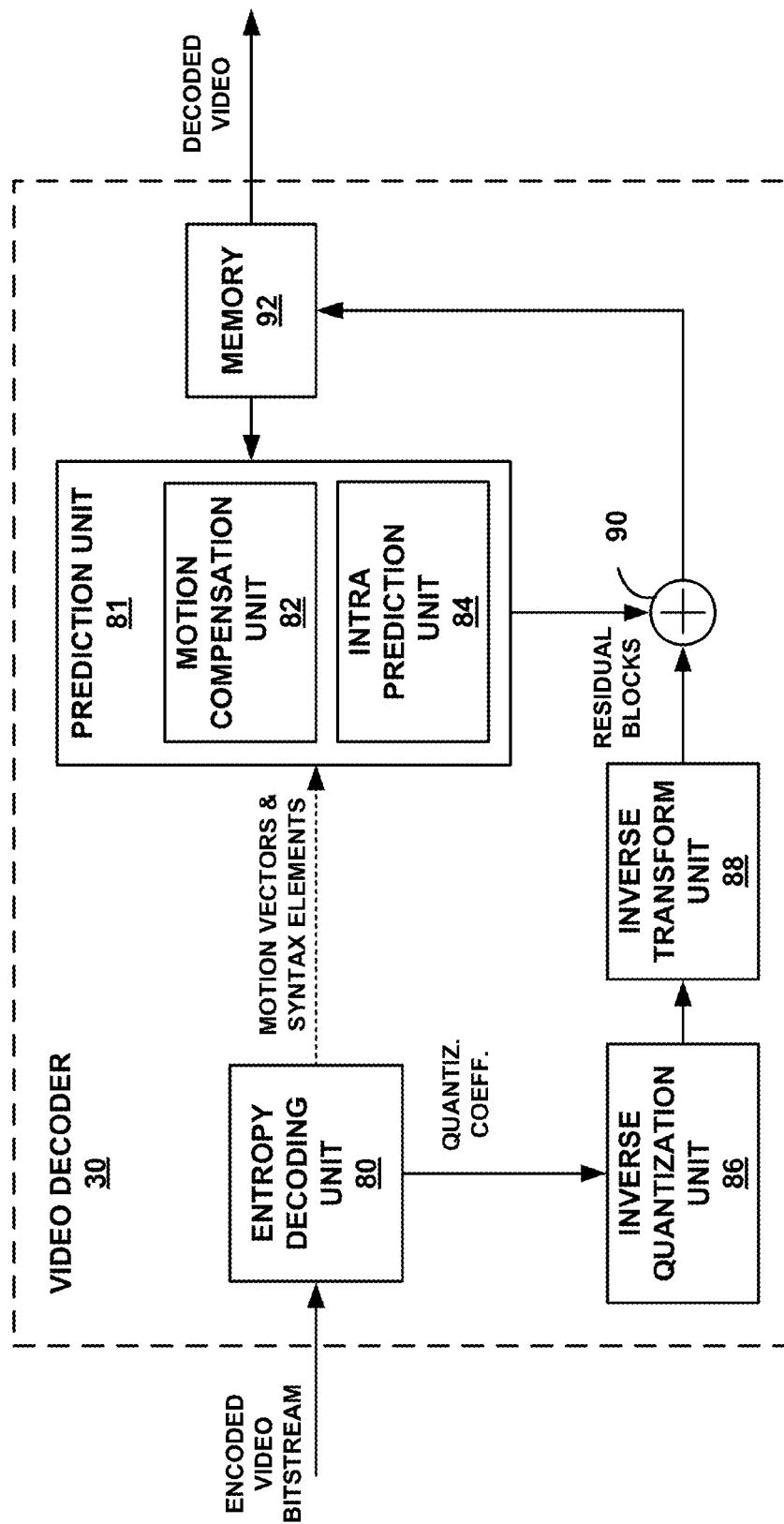
FIG. 4 is a block diagram illustrating an example of a video decoder that decodes an encoded video sequence received from the video encoder from FIG. 2.

FIG. 4 is a block diagram illustrating an example of video decoder 30 that decodes an encoded video sequence received from video encoder 20 from FIG. 2. In accordance with this disclosure, the techniques performed by video encoder 20 to sufficiently compress the video blocks for encoding may prevent the appearance of undesirable color/gray patches in the video sequence when decoded by video decoder 30 and displayed on display device 32 from FIG. 1. Video decoder 30 may therefore comprise a standard video decoder and need not necessarily be specially configured to effect or utilize the techniques of this disclosure.

In the example of FIG. 4, video decoder 30 includes an entropy decoding unit 80, prediction unit 81, inverse quantization unit 86, inverse transform unit 88, summer 90, and memory 92. Prediction unit 81 includes motion compensation unit 82 and intra prediction unit 84. Video decoder 30 may, in some examples, perform a decoding pass generally reciprocal to the encoding pass described with respect to video encoder 20.

During the decoding process, video decoder 30 receives an encoded video bitstream that includes an encoded video frame and syntax elements that represent coding information from video encoder 20. Entropy decoding unit 80 of video decoder 30 then entropy decodes the bitstream to generate quantized coefficients, motion vectors, and other prediction syntax. The prediction syntax may include syntax elements defined to indicate an encoding mode and a QP value for each video block within the encoded video sequence.

Motion compensation unit 82 may use motion vectors and an encoding mode signaled for a current video block to generate a predictive block from one or more reference frames stored in memory 92. When the signaled encoding mode is the intra-encoding mode, in the ITU-T H.264 standard and the emerging HEVC standard, intra prediction unit 84 may generate a predictive block from spatially adjacent blocks in the same frame or slice as the current video block to be decoded. For the intra-encoding mode in the ITU-T H.263-P0 standard, intra prediction unit 84 may perform spatial prediction of the quantized coefficients of the current video block decoded by entropy decoding unit 80 before inverse quantization unit 86 based on spatially adjacent blocks of quantized transform coefficients in the same frame or slice as the current block.

Inverse quantization unit 86 inverse quantizes, i.e., de-quantizes, the quantized coefficients provided in the bitstream and decoded by entropy decoding unit 80. According to the techniques of this disclosure, inverse quantization unit 86 may inverse quantize the coefficients according to the QP value determined by encoder 20 and signaled for the current video block. In this way, the encoding mode and QP value determined by video encoder 20 for the current video block may prevent the appearance of undesirable color/gray patches in the video sequence when decoded by video decoder 30.

Inverse transform unit 88 applies an inverse transform, e.g., an inverse DCT, an inverse integer transform, or a conceptually similar inverse transform process, to the transform coefficients in order to produce residual blocks in the pixel domain. Motion compensation unit 82 produces motion compensated predictive blocks, possibly performing interpolation based on interpolation filters. Motion compensation unit 82 may use interpolation filters as used by video encoder 20 during encoding of the video block to calculate interpolated values for sub-integer pixels of a predictive block. Identifiers for interpolation filters to be used for motion estimation with sub-pixel precision may be included in the syntax elements.

After inverse transform unit 88 generates the residual block, video decoder 30 forms a decoded video block by summing the residual block from inverse transform unit 88 with the corresponding predictive block from prediction unit 81. Summer 90 represents the component or components that perform this summation operation. For the intra-encoding mode in the ITU-T H.263-P0 standard, video decoder 30 may apply no predictive block or may apply a block of zeros to summer 90 to generate the decoded video block. For example, video decoder 30 may perform no addition operation at summer 90, or may add the block of zeros to the residual block. In either way, the decoded video block will include the same pixel values as the decoded residual block.

The decoded video blocks are then stored in memory 92, which provides reference blocks within reference frames for subsequent motion compensation. If desired, a deblocking filter may also be applied to filter the decoded blocks in order to remove blockiness artifacts. Memory 92 also produces decoded video for presentation on a display device, such as display device 32 of FIG. 1, without the appearance of undesirable color/gray patches.

Figure 5:
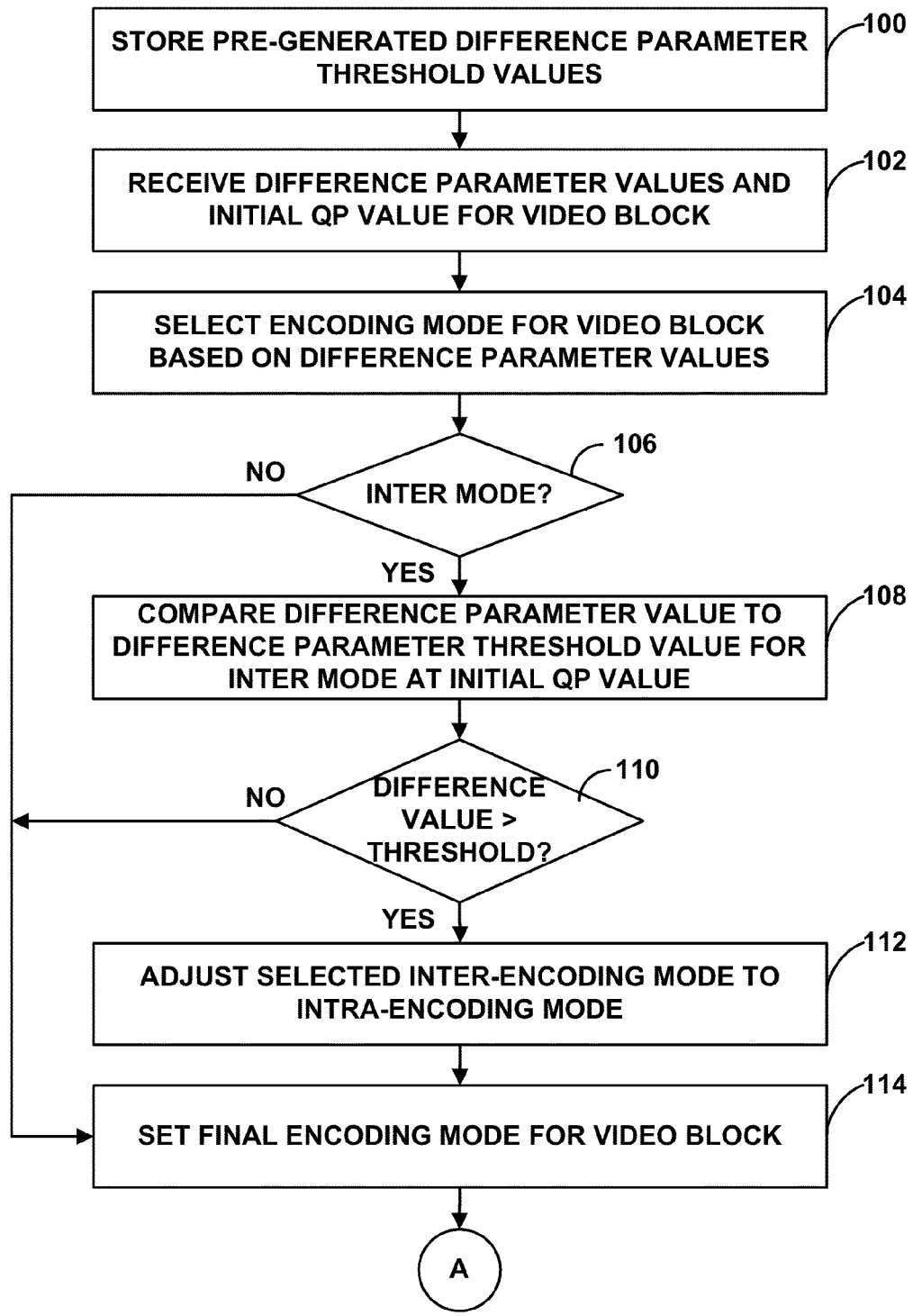
FIG. 5 is a flowchart illustrating an example operation of predicting generation of out-of-bound quantized transform coefficients and adjusting the selected encoding mode for a video block.
Figure 6:
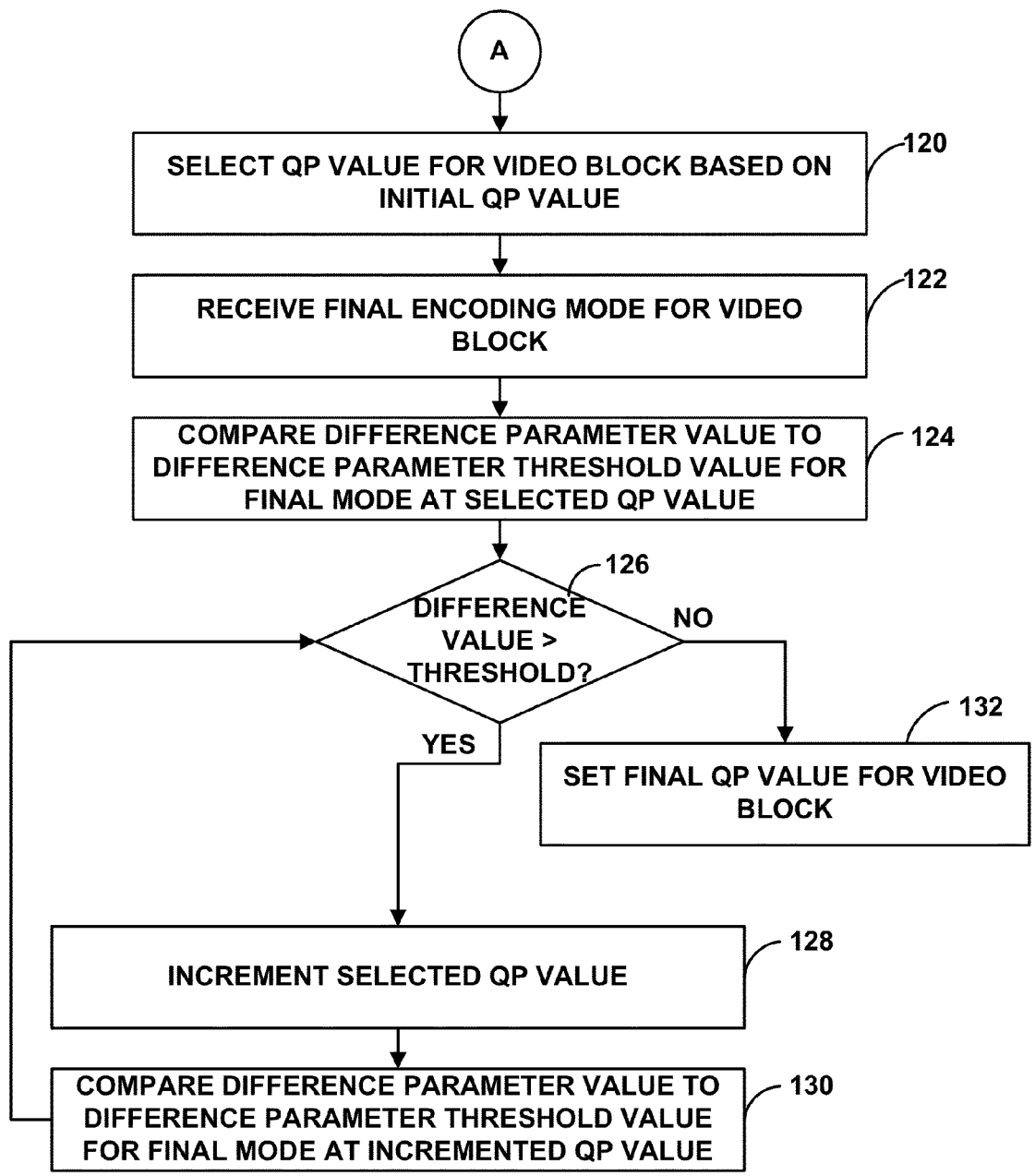
FIG. 6 is a flowchart illustrating an example operation of predicting generation of out-of-bound quantized transform coefficients and adjusting the selected QP value for a video block.

FIGS. 5 and 6 are flowcharts illustrating an example operation of preventing the appearance of undesirable color/gray patches in decoded video sequences by predicting generation of out-of-bound quantized transform coefficients, and adjusting at least one of a selected encoding mode and a selected QP value for a video block to prevent the generation of out-of-bound quantized transform coefficients. The example operation illustrated in FIGS. 5 and 6 first adjusts a selected encoding mode of a video block when out-of-bound quantized transform coefficients are predicted, and second adjusts a selected QP value using an iterative process until out-of-bound quantized transform coefficients are no longer predicted.

The operation illustrated in FIGS. 5 and 6 is merely one exemplary implementation of the techniques for setting a final encoding mode and QP value for a video block that will prevent generation of out-of-bound quantized transform coefficients and, therefore, prevent the appearance of color/gray patches in the video sequence when decoded. In other examples, an operation may simultaneously adjust both a selected encoding mode and a selected QP value for a video block using an iterative process until out-of-bound quantized transform coefficients are no longer predicted. This example operation may require more iterations and checks with the stored difference parameter threshold values, than the illustrated operation.

FIG. 5 is a flowchart illustrating an example operation of predicting generation of out-of-bound quantized transform coefficients and adjusting the selected encoding mode for a video block. The illustrated operation is described with reference to out-of-bound prediction unit 48 from FIGS. 2 and 3. Out-of-bound prediction unit 48 may store pre-generated difference parameter threshold values in inter threshold table 76 and intra threshold table 78 within threshold memory 74 (100). Inter threshold table 76 may store difference parameter threshold values at which out-of-bound quantized transform coefficients are generated for the inter-encoding mode at different QP values. Similarly, intra threshold table 76 may store difference parameter threshold values at which out-of-bound quantized transform coefficients are generated for the intra-encoding mode at each of a plurality of difference QP values.

Out-of-bound prediction unit 48 receives difference parameter values and an initial QP value for a video block to be encoded from prediction unit 41 in video encoder 20 (102). For example, out-of-bound prediction unit 48 may receive difference parameter values of the video block for both the inter-encoding mode and the intra-encoding mode. As described above, the difference parameter values of the video block may be calculated by prediction unit 41 after performing either spatial or temporal prediction of the video block based on a predictive block. The initial QP value may also be calculated by prediction unit 41 based on the difference parameter values of the video block, the QP value of a previous block or the predictive block, or available bits for the video block.

Mode selection unit 66 in out-of-bound prediction unit 48 then selects an encoding mode for the video block based on the received difference parameter values for the video block (104). For example, mode selection unit 66 may select the inter-encoding mode or the intra-encoding mode for the video block depending on which of the modes is associated with the smallest difference parameter value.

When mode selection unit 66 selects the intra-encoding mode for the video block (NO branch of 106), mode prediction and adjustment unit 68 sets the intra-encoding mode as the final encoding mode for the video block (114). Mode prediction and adjustment unit 68 maintains the selected intra-encoding mode because the inter-encoding mode is inherently more prone to generation of out-of-bound coefficients than the intra-encoding mode, which typically does not generate out-of-bound quantized transform coefficients at QP values greater than 3.

When mode selection unit 66 selects the inter-encoding mode for the video block (YES branch of 106), mode prediction and adjustment unit 68 compares the difference parameter value of the video block for the inter-encoding mode to a difference parameter threshold value for the inter-encoding mode at the initial QP value (108). Mode prediction and adjustment unit 68 may look up the difference parameter threshold value in inter threshold table 76 based on the initial QP value. As an example, in the inter threshold table of Table 1, above, the inter SAD threshold value at an initial QP value equal to 3 is equal to 6000.

Based on the comparison, mode prediction and adjustment unit 68 may then determine whether the difference parameter value of the video block for the inter-encoding mode is greater than the difference parameter threshold value for the inter-encoding mode at the initial QP value (110). For example, mode prediction and adjustment unit 68 determines whether the inter SAD value of the video block is greater than 6000. If the difference parameter value of the video block is greater than the difference parameter threshold value (YES branch of 110), mode prediction and adjustment unit 68 adjusts the selected inter-encoding mode to the intra-encoding mode (112). Mode prediction and adjustment unit 68 sets the intra-encoding mode as the final encoding mode for the video block (114).

If the difference parameter value of the video block is less than the difference parameter threshold value (NO branch of 110), mode prediction and adjustment unit 68 sets the selected inter-encoding mode as the final encoding mode for the video block (114). Regardless of how the final encoding mode is set, mode prediction and adjustment unit 68 sends the final encoding mode to QP value prediction and adjustment unit 72.

FIG. 6 is a flowchart illustrating an example operation of predicting generation of out-of-bound quantized transform coefficients and adjusting the selected QP value for a video block. The illustrated operation is described with reference to out-of-bound prediction unit 48 from FIGS. 2 and 3. As described above in step 102 of FIG. 5, out-of-bound prediction unit 48 receives difference parameter values and an initial QP value for the video block to be encoded from prediction unit 41. QP value selection unit 70 in out-of-bound prediction unit 48 then selects a QP value for the video block based on the received initial QP value and/or the received difference parameter values of the video block (120).

QP value prediction and adjustment unit 72 receives the final encoding mode for the video block from mode prediction and adjustment unit 68 (122). QP value prediction and adjustment unit 72 then compares the difference parameter value of the video block for the final encoding mode to a difference parameter threshold value for the final encoding mode at the selected QP value (124). QP prediction and adjustment unit 72 may look up the difference parameter threshold value in inter threshold table 76 when the final encoding mode is the inter-encoding mode, or intra threshold table 78 when the final encoding mode is intra-encoding mode based on the selected QP value. As an example, in the inter threshold table of Table 1, above, the inter SAD threshold value at a selected QP value equal to 3 is equal to 6000. As another example, in the intra threshold table of Table 2, above, the intra SAD threshold value at a selected QP value equal to 3 is equal to 12000.

Based on the comparison, QP value prediction and adjustment unit 72 may then determine whether the difference parameter value of the video block for the final encoding mode is greater than the difference parameter threshold value for the final encoding mode at the selected QP value (126). For example, QP value prediction and adjustment unit 72 may determine whether the inter SAD value of the video block is greater than 6000 when the final encoding mode is the inter-encoding mode, or whether the intra SAD value of the video block is greater than 12000 when the final encoding mode is the intra-encoding mode.

If the difference parameter value of the video block is less than the difference parameter threshold value at the selected QP value (NO branch of 126), QP value prediction and adjustment unit 72 sets the selected QP value as the final QP value for the video block (132).

If the difference parameter value of the video block is greater than the difference parameter threshold value at the selected QP value (YES branch of 126), QP value prediction and adjustment unit 72 increments the selected QP value (128). For example, QP value prediction and adjustment unit 72 may iteratively increment the selected QP value by steps of 1. In other examples, the selected QP value may be incremented by larger steps or variable steps. QP value prediction and adjustment unit 72 then compares the difference parameter value of the video block for the final encoding mode to a difference parameter threshold value for the final encoding mode at the incremented QP value (130).

If the difference parameter value of the video block is still greater than the difference parameter threshold value at the incremented QP value (YES branch of 126), QP value prediction and adjustment unit 72 again increments the selected QP value (128) and compares the difference parameter value of the video block to a difference parameter threshold value at the incremented QP value (130). QP value prediction and adjustment unit 72 may continue this iterative process until the difference parameter value of the video block is less than the difference parameter threshold value at the incremented QP value (NO branch of 126). QP value prediction and adjustment unit 72 then sets the incremented QP value as the final QP value for the video block (132).

Video encoder 20 then uses the final encoding mode and the final QP value to generate a residual video block, transform the residual video block, and quantize the transform coefficients of the video block. The techniques described above enable video encoder 20 to predict the generation of out-of-bound quantized transform coefficients for a video block and iteratively adjust at least one of the selected encoding mode and the selected QP value for the video block until out-of-bound quantized transform coefficients are no longer predicted. In this way, video encoder 20 may sufficiently compress the video block for encoding to prevent the appearance of color/gray patches in the video sequence when decoded, and still achieve high video quality and the target video bit-rate.

Figure 7:
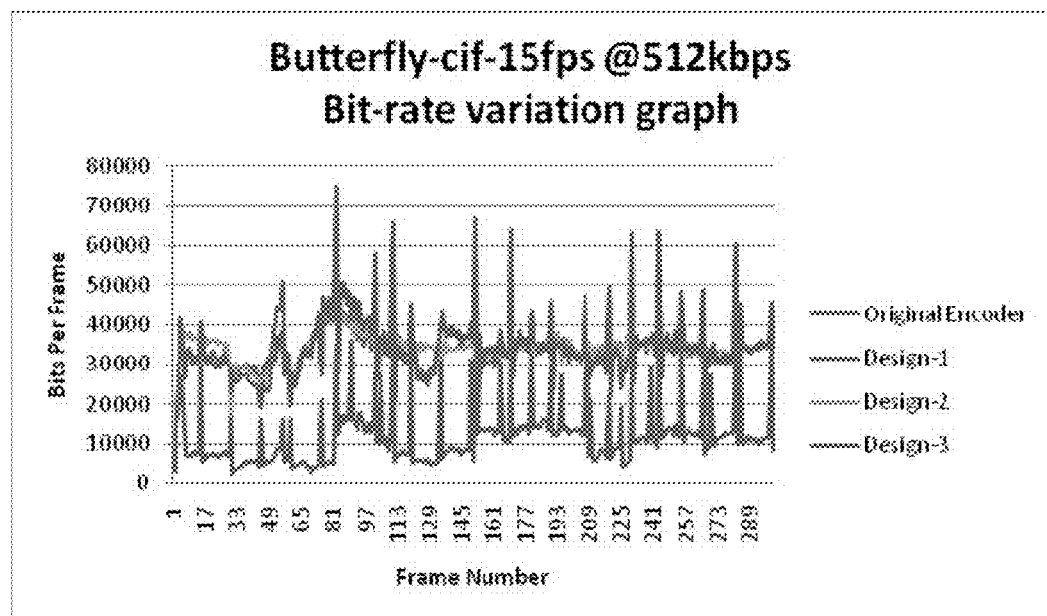
FIG. 7 is a graph illustrating a comparison of bit-rate performances by different encoder designs over a number of video frames at moderately high bit-rates.
Figure 8:
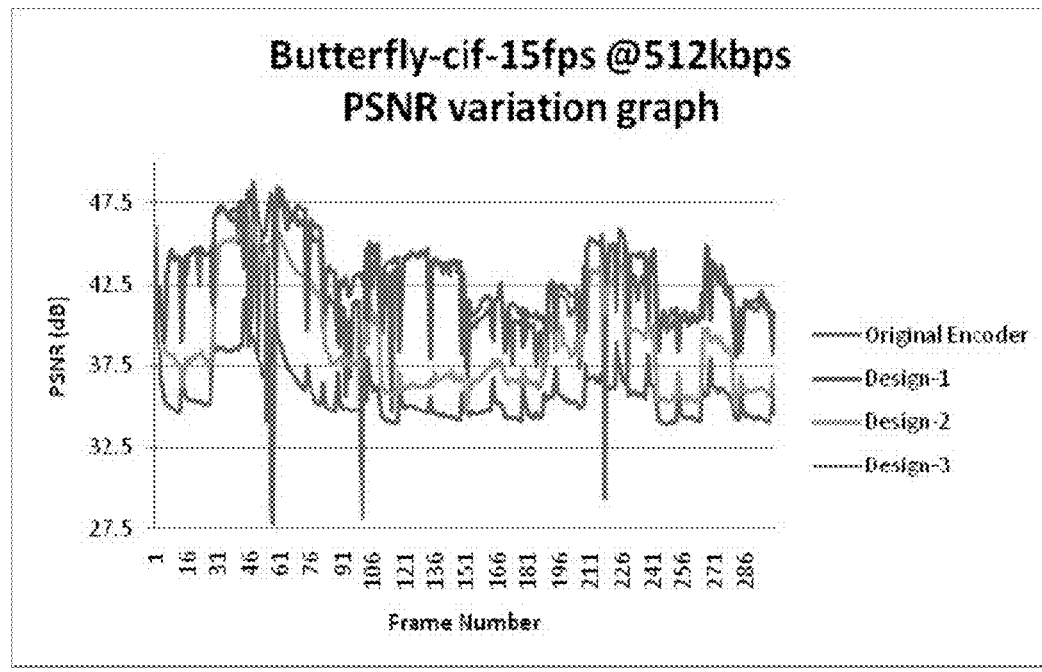
FIG. 8 is a chart illustrating a comparison of peak signal-to-noise ratio (PSNR) performances by different encoder designs over a number of video frames at moderately high bit-rates.
Figure 9:
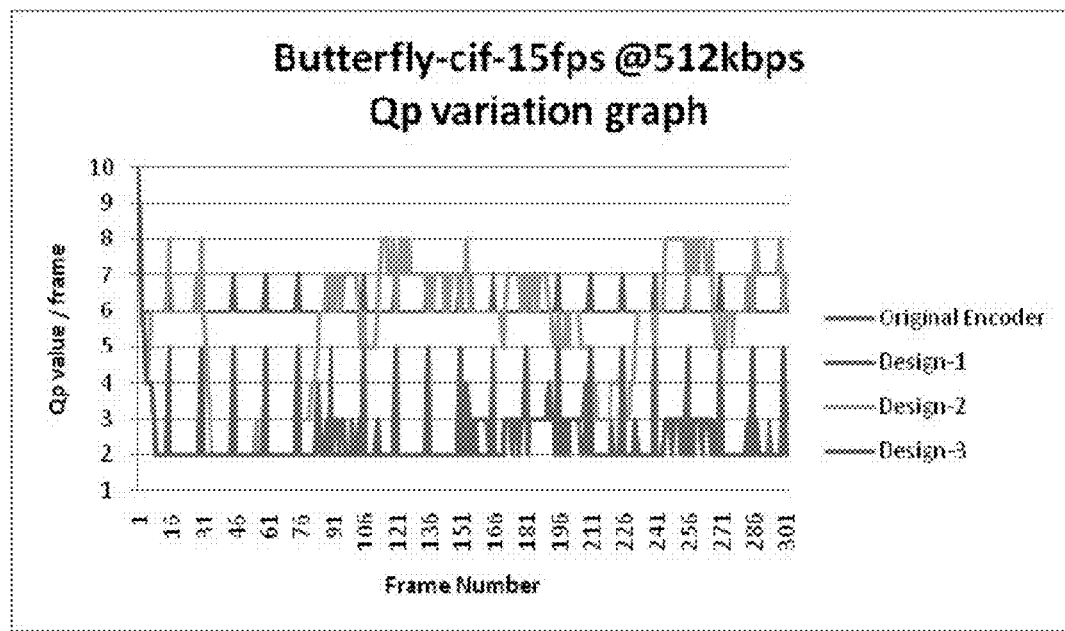
FIG. 9 is a graph illustrating a comparison of QP value performances by different encoder designs over a number of video frames at moderately high bit-rates.

FIGS. 7-9 are graphs illustrating comparisons of efficiency and quality between a conventional encoder (Original Encoder), an encoder that limits the minimum QP value to 7 (Design-1), an encoder that forces the intra-encoding mode for QP values greater than 8 and limits the minimum QP value to 3 (Design-2), and an encoder that implements the disclosed technique of predicting out-of-bound quantized transform coefficients and adjusting the encoding mode and QP value based on the prediction (Design-3). FIGS. 7-9 illustrate that the disclosed technique is successful at preventing the color/gray patches in the decoded video sequence, and, unlike the prior solutions, also maintains or improves encoding quality over a conventional encoder. FIGS. 7-9 illustrate results from an encoder using video compression techniques included in the ITU-T H.263-P0, MPEG-4, Short Video Header standard at a moderately high bit-rate of 512 kbps.

FIG. 7 is a graph illustrating a comparison of bit-rate performances by different encoder designs over a number of video frames at moderately high bit-rates. FIG. 7 shows that the disclosed technique (Design-3) is capable of either closely tracking the bit-rate of the Original Encoder or consuming less bits per frame than the Original Encoder, while preventing the appearance of color/gray patches in the decoded video sequence. Design-1 consumes so few bits per frame that it does not achieve the target bit-rate. Design-2 consumes a relatively constant number of bits per frame, which may be more bits per frame than the Original Encoder due to the increased use of the intra-encoding mode.

FIG. 8 is a chart illustrating a comparison of peak signal-to-noise ratio (PSNR) performances by different encoder designs over a number of video frames at moderatly high bit-rates. FIG. 8 shows that the disclosed technique (Design-3) is capable of improving the PSNR, which is an encoding quality metric, over the Original Encoder. Design-3 closely tracks the PSNR of the Original Encoder when no color/gray patches occur, and improves the PSNR over that of the Original Encoder when color/gray patches are prevented. Design-3 also results in a smoother, more constant PSNR across frames, which is very desirable. Design-1 provides the lowest PSNR and, therefore, the lowest quality encoder performance. Design-2 provides a fluctuating PSNR that is better than Design-1, but typically under-performs the Original Encoder.

FIG. 9 is a graph illustrating a comparison of QP value performances by different encoder designs over a number of video frames at moderately high bit-rates. FIG. 9 shows that the disclosed technique (Design-3) is capable of tracking or out-performing the rate control of the Original Encoder by using the full range of QP values, including low QP values, across frames. Design-1 consistently uses high QP values due to the imposed minimum QP value of 7. Design-2 uses a large dynamic range of QP values, which causes encoder quality fluctuations across frames.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method of encoding video data, the method comprising:
   selecting an encoding mode for a video block;
   selecting a quantization parameter (QP) value for the video block;
   prior to generating a residual block for the video block, predicting whether out-of-bound quantized transform coefficients will be generated for the video block based on difference parameter threshold values, wherein the difference parameter threshold values comprise minimum pixel value differences between the video block and a predictive video block at which the out-of-bound quantized transform coefficients will be generated for each encoding mode at different QP values, and wherein predicting whether the out-of-bound quantized transform coefficients will be generated for the video block further comprises:
   comparing a difference parameter value of the video block for the selected encoding mode to one of the difference parameter threshold values for the selected encoding mode at the selected QP value, and
   when the difference parameter value of the video block exceeds the difference parameter threshold value, predicting that the out-of-bound quantized transform coefficients will be generated for the video block; and
   when generation of the out-of-bound quantized transform coefficients is predicted, adjusting at least one of the selected encoding mode and the selected QP value for the video block.

2. The method of claim 1, wherein the difference parameter threshold values comprise one of sum of absolute differences (SAD) threshold values, sum of squared differences (SSD) threshold values, and sum of absolute transformed differences (SATD) threshold values.

3. The method of claim 1, further comprising storing the difference parameter threshold values in a memory, wherein the difference parameter threshold values are pre-generated based on profiling video data according to a training set of different QP values for each encoding mode.

4. P The method of claim 1, wherein adjusting at least one of the selected encoding mode and the selected QP value comprises adjusting at least one of the selected encoding mode and the selected QP value until the difference parameter value of the video block does not exceed one of the difference parameter threshold values for a final encoding mode at a final QP value.

5. The method of claim 1, wherein
   wherein the selected QP value is an initial QP value, and
   wherein, when the selected encoding mode is an inter-encoding mode, comparing the difference parameter value of the video block comprises comparing the difference parameter value of the video block for the inter-encoding mode to one of the difference parameter threshold values for the inter-encoding mode at the initial QP value; and
   when the difference parameter value of the video block exceeds the difference parameter threshold value, predicting that out-of-bound quantized transform coefficients will be generated for the video block.

6. The method of claim 5, wherein adjusting at least one of the selected encoding mode and the selected QP value for the video block comprises, when the difference parameter value of the video block exceeds the difference parameter threshold value, adjusting the selected encoding mode from the inter-encoding mode to an intra-encoding mode, and further comprising setting the intra-encoding mode as a final encoding mode for the video block.

7. The method of claim 5, further comprising, when the difference parameter value of the video block does not exceed the difference parameter threshold value, setting the inter-encoding mode as a final encoding mode for the video block.

8. The method of claim 1, further comprising, when the selected encoding mode is an intra-encoding mode, setting the intra-encoding mode as a final encoding mode for the video block.

9. The method of claim 1,
wherein the selected encoding mode is a final encoding mode for the video block, and wherein comparing the difference parameter value of the video block comprises comparing the difference parameter value of the video block for the final encoding mode to one of the difference parameter threshold values for the final encoding mode at the selected QP value.

10. The method of claim 9, wherein adjusting at least one of the selected encoding mode and the selected QP value for the video block comprises, when the difference parameter value of the video block exceeds the difference parameter threshold value, adjusting the selected QP value until the difference parameter value of the video block does not exceed one of the difference parameter threshold values for the final encoding mode at the adjusted QP value, and further comprising setting the adjusted QP value as a final QP value for the video block.

11. The method of claim 10, wherein adjusting the selected QP value comprises:
iteratively incrementing the selected QP value; and
comparing the difference parameter value of the video block for the final encoding mode to the difference parameter threshold values for the final encoding mode at each incremented QP value until the difference parameter value of the video block does not exceed one of the difference parameter threshold values for the final encoding mode at the incremented QP value.

12. The method of claim 9, further comprising, when the difference parameter value of the video block does not exceed the difference parameter threshold value, setting the selected QP value as a final QP value for the video block.

13. A video encoding device for encoding video data comprising:
a memory configured to store video data; and
a processor configured to:
select an encoding mode for a video block,
select a quantization parameter (QP) value for the video block,
prior to generating a residual block for the video block, predict whether out-of-bound quantized transform coefficients will be generated for the video block based on difference parameter threshold values, wherein the difference parameter threshold values comprise minimum pixel value differences between the video block and a predictive video block at which the out-of-bound quantized transform coefficients will be generated for each encoding mode at different QP values, and wherein the processor is further configured to:
compare a difference parameter value of the video block for the selected encoding mode to one of the difference parameter threshold values for the selected encoding mode at the selected QP value; and
when the difference parameter value of the video block exceeds the difference parameter threshold value, predict that the out-of-bound quantized transform coefficients will be generated for the video block, and
when generation of the out-of-bound quantized transform coefficients is predicted, adjust at least one of the selected encoding mode and the selected QP value for the video block.

14. The video encoding device of claim 13, wherein the difference parameter threshold values comprise one of sum of absolute differences (SAD) threshold values, sum of squared differences (SSD) threshold values, and sum of absolute transformed differences (SATD) threshold values.

15. The video encoding device of claim 13, wherein the difference parameter threshold values are pre-generated based on profiling video data according to a training set of different QP values for each encoding mode, and wherein the memory stores the difference parameter threshold values.

16. The video encoding device of claim 13, wherein the processor adjusts at least one of the selected encoding mode and the selected QP value until the difference parameter value of the video block does not exceed one of the difference parameter threshold values for a final encoding mode at a final QP value.

17. The video encoding device of claim 13, wherein the selected QP value is an initial QP value, and wherein the processor is configured to:
when the selected encoding mode is an inter-encoding mode, compare the difference parameter value of the video block for the inter-encoding mode to one of the difference parameter threshold values for the inter-encoding mode at the initial QP value.

18. The video encoding device of claim 17, wherein, when the difference parameter value of the video block exceeds the difference parameter threshold value, the processor adjusts the selected encoding mode from the inter-encoding mode to an intra-encoding mode, and sets the intra-encoding mode as a final encoding mode for the video block.

19. The video encoding device of claim 17, wherein, when the difference parameter value of the video block does not exceed the difference parameter threshold value, the processor sets the inter-encoding mode as a final encoding mode for the video block.

20. The video encoding device of claim 13, wherein, when the selected encoding mode is an intra-encoding mode, the processor sets the intra-encoding mode as a final encoding mode for the video block.

21. The video encoding device of claim 13, wherein the selected encoding mode is a final encoding mode for the video block, and wherein the processor is configured to:
compares the difference parameter value of the video block for the final encoding mode to one of the difference parameter threshold values for the final encoding mode at the selected QP value.

22. The video encoding device of claim 21, wherein, when the difference parameter value of the video block exceeds the difference parameter threshold value, the processor adjusts the selected QP value until the difference parameter value of the video block does not exceed one of the difference parameter threshold values for the final encoding mode at the adjusted QP value, and sets the adjusted QP value as a final QP value for the video block.

23. The video encoding device of claim 22, wherein the processor adjusts the selected QP value by:
iteratively incrementing the selected QP value; and
comparing the difference parameter value of the video block for the final encoding mode to the difference parameter threshold values for the final encoding mode at each incremented QP value, until the difference parameter value of the video block does not exceed one of the difference parameter threshold values for the final encoding mode at the incremented QP value.

24. The video encoding device of claim 21, wherein, when the difference parameter value of the video block does not exceed the difference parameter threshold value, the processor sets the selected QP value as a final QP value for the video block.

25. A video encoding device for encoding video data comprising:
means for selecting an encoding mode for a video block;
means for selecting a quantization parameter (QP) value for the video block;

means for predicting, prior to generating a residual block for the video block, whether out-of-bound quantized transform coefficients will be generated for the video block based on difference parameter threshold values, wherein the difference parameter threshold values comprise minimum pixel value differences between the video block and a predictive video block at which the out-of-bound quantized transform coefficients will be generated for each encoding mode at different QP values, and wherein the means for predicting further comprise:

means for comparing a difference parameter value of the video block for the selected encoding mode to one of the difference parameter threshold values for the selected encoding mode at the selected QP value, and when the difference parameter value of the video block exceeds the difference parameter threshold value, means for predicting that out-of-bound quantized transform coefficients will be generated for the video block; and when generation of the out-of-bound quantized transform coefficients is predicted, means for adjusting at least one of the selected encoding mode and the selected QP value for the video block.

26. The video encoding device of claim 25, further comprising means for storing the difference parameter threshold values, wherein the difference parameter threshold values are pre-generated based on profiling video data according to a training set of different QP values for each encoding mode.

27. The video encoding device of claim 25, further comprising means for adjusting at least one of the selected encoding mode and the selected QP value until the difference parameter value of the video block does not exceed one of the difference parameter threshold values for a final encoding mode at a final QP value.

28. The video encoding device of claim 25,
wherein the selected QP value is an initial QP value, and wherein, when the selected encoding mode is an inter-encoding mode, the means for comparing further comprise means for comparing the difference parameter value of the video block for the inter-encoding mode to one of the difference parameter threshold values for the inter-encoding mode at the initial QP value.

29. The video encoding device of claim 28, further comprising, when the difference parameter value of the video block exceeds the difference parameter threshold value, means for adjusting the selected encoding mode from the inter-encoding mode to an intra-encoding mode, and means for setting the intra-encoding mode as a final encoding mode for the video block.

30. The video encoding device of claim 25,
wherein the selected encoding mode is a final encoding mode for the video block, and wherein the means for comparing further comprise means for comparing a the difference parameter value of the video block for the final encoding mode to one of the difference parameter threshold values for the final encoding mode at the selected QP value.

31. The video encoding device of claim 30, further comprising, when the difference parameter value of the video block exceeds the difference parameter threshold value, means for adjusting the selected QP value until the difference parameter value of the video block does not exceed one of the difference parameter threshold values for the final encoding mode at the adjusted QP value, and means for setting the adjusted QP value as a final QP value for the video block.

32. The video encoding device of claim 31, wherein the means for adjusting the selected QP value further comprise:

means for iteratively incrementing the selected QP value; and means for comparing the difference parameter value of the video block for the final encoding mode to a the difference parameter threshold values for the final encoding mode at each incremented QP value until the difference parameter value of the video block does not exceed one of the difference parameter threshold values for the final encoding mode at the incremented QP value.

33. A computer-readable medium comprising instructions for encoding video data that, when executed, cause a programmable processor to:

select an encoding mode for a video block;

select a quantization parameter (QP) value for the video block;

prior to generating a residual block for the video block, predict whether out-of-bound quantized transform coefficients will be generated for the video block based on difference parameter threshold values, wherein the difference parameter threshold values comprise minimum pixel value differences between the video block and a predictive video block at which the out-of-bound quantized transform coefficients will be generated for each encoding mode at different QP values, and wherein the instructions further cause the programmable processor to:

compare a difference parameter value of the video block for the selected encoding mode to one of the difference parameter threshold values for the selected encoding mode at the selected QP value; and when the difference parameter value of the video block exceeds the difference parameter threshold value, predict that out-of-bound quantized transform coefficients will be generated for the video block; and when generation of the out-of-bound quantized transform coefficients is predicted, adjust at least one of the selected encoding mode and the selected QP value for the video block.

34. The computer-readable medium of claim 33, further comprising instructions that cause the programmable processor to store the difference parameter threshold values in a memory, wherein the difference parameter threshold values are pre-generated based on profiling video data according to a training set of different QP values for each encoding mode.

35. The computer-readable medium of claim 33, further comprising instructions that cause the programmable processor to adjust at least one of the selected encoding mode and the selected QP value until the difference parameter value of the video block does not exceed one of the difference parameter threshold values for a final encoding mode at a final QP value.

36. The computer-readable medium of claim 33, wherein the selected QP value is an initial QP value, and wherein the instructions cause the programmable processor to:

when the selected encoding mode is an inter-encoding mode, compare a the difference parameter value of the video block for the inter-encoding mode to one of the difference parameter threshold values for the inter-encoding mode at the initial QP value.

37. The computer-readable medium of claim 36, wherein, when the difference parameter value of the video block exceeds the difference parameter threshold value, the instructions cause the programmable processor to adjust the selected encoding mode from the inter-encoding mode to an intra-encoding mode, and set the intra-encoding mode as a final encoding mode for the video block.

38. The computer-readable medium of claim 33, wherein the selected encoding mode is a final encoding mode for the video block, and wherein the instructions cause the programmable processor to:
compare the difference parameter value of the video block for the final encoding mode to one of the difference parameter threshold values for the final encoding mode at the selected QP value.

39. The computer-readable medium of claim 38, wherein, when the difference parameter value of the video block exceeds the difference parameter threshold value, the instructions cause the programmable processor to adjust the selected QP value until the difference parameter value of the video block does not exceed one of the difference parameter threshold values for the final encoding mode at the adjusted QP value, and set the adjusted QP value as a final QP value for the video block.

40. The computer-readable medium of claim 39, wherein the instructions cause the programmable processor to:
iteratively increment the selected QP value; and
compare the difference parameter value of the video block for the final encoding mode to the difference parameter threshold values for the final encoding mode at each incremented QP value, until the difference parameter value of the video block does not exceed one of the difference parameter threshold values for the final encoding mode at the incremented QP value.

\* \* \* \* \*